US012675007B1

(12) United States Patent
Fang et al.

(10) Patent No.: US 12,675,007 B1
(45) Date of Patent: Jul. 7, 2026

(54) ULTRA-LOW-ENERGY NON-VOLATILE PHASE SHIFTERS

(71) Applicant: The Charles Stark Draper Laboratory, Inc., Cambridge, MA (US)

(72) Inventors: Zhuoran Fang, Seattle, WA (US); Rui Chen, Seattle, WA (US); Jiajiu Zheng, Seattle, WA (US); Asir Intisar Khan, Stanford, CA (US); Kathryn M. Neilson, Stanford, CA (US); Sarah J. Geiger, Cambridge, MA (US); Dennis M. Callahan, Jr., Cambridge, MA (US); Michael G. Moebius, Cambridge, MA (US); Abhi Saxena, Seattle, WA (US); Michelle E. Chen, Stanford, CA (US); Carlos Rios, College Park, MD (US); Juejun Hu, Cambridge, MA (US); Eric Pop, Stanford, CA (US); Arka Majumdar, Seattle, WA (US)

( * ) Notice: Subject to any disclaimer, the term of this patent is extended or adjusted under 35 U.S.C. 154(b) by 373 days.

(21) Appl. No.: 18/200,364

(22) Filed: May 22, 2023

Related U.S. Application Data

(60) Provisional application No. 63/468,140, filed on May 22, 2023, provisional application No. 63/365,135, filed on May 23, 2022.

(51) Int. Cl.
*G02F 1/01* (2006.01)
(52) U.S. Cl.
CPC ...... *G02F 1/0147* (2013.01); *G02F 2201/063* (2013.01); *G02F 2203/50* (2013.01)
(58) Field of Classification Search
CPC ........ G02F 1/025; G02F 1/035; G02F 1/0147; G02F 2201/063; G02F 2203/50

USPC ................................................ 385/1–3, 8–10
See application file for complete search history.

(56) References Cited

U.S. PATENT DOCUMENTS 7,269,305 B2 * 9/2007 Tsuda .................... G02F 1/3136
                                                                385/16
2019/0339585 A1 * 11/2019 Heck ........................ G02F 1/295

OTHER PUBLICATIONS

"Multi-level electro-thermal switching of optical phase-change materials using graphene" by Rios at el, Adv. Photonics Res., paper 2000034, pp. 1-13 (Year: 2020).*
"Graphene as a two-dimensional material" by Katsnelson, article in Encyclopedia Britannica (Year: 2020).*
(Continued)

*Primary Examiner* — Robert Tavlykaev
(74) *Attorney, Agent, or Firm* — Daly, Crowley, Mofford & Durkee, LLP

(57) ABSTRACT

In one aspect, an integrated photonic device is disclosed, which comprises a waveguide through which radiation having one or more wavelengths within a wavelength band can propagate, a phase shifter optically coupled to said waveguide. The phase shifter comprises a heat-actuable phase change material (PCM) optically coupled to the waveguide, and a heater having a layer of a two-dimensional material in thermal communication with the PCM and configured to receive a reset voltage pulse for causing heating of the graphene layer followed by cooling thereof, wherein the thermal communication between the heated graphene layer and the PCM causes at least a portion of the PCM to undergo a phase transition from a crystalline state to an amorphous state, thereby causing a change in a refractive index of the PCM and a resultant phase shift in the radiation propagating through the waveguide.

31 Claims, 35 Drawing Sheets

(56)              References Cited

OTHER PUBLICATIONS

"Modeling Electrical Switching of Nonvolatile Phase-Change Integrated Nanophotonic Structures with Graphene Heaters" by Zheng at el, ACS Appl. Mater. Interfaces, vol. 12, pp. 21827-21836 (Year: 2020).*

"Silicon Thermo-Optic Switches with Graphene Heaters Operating at Mid-Infrared Waveband" by Zhong et al, Nanomaterials, vol. 12, No. 7, paper 1083, March (Year: 2022).*

"Non-Volatile Reconfigurable Integrated Photonics Enabled by Broadband Low-Loss Phase Change Material" by Fang et al, Adv. Optical Mater., vol. 9, paper 2002049, March (Year: 2021).*

"Hybrid Si3N4/VO2 Modulator Thermally Triggered by a Graphene Microheater" by Janjan et al., IEEE Journal of Selected Topics in Quantum Electronics, vol. 26, No. 5, paper 3400206 (Year: 2020).*

"High-Speed and On-Chip Optical Switch Based on a Graphene Microheater" by Nakamura et al, ACS Nano, vol. 16, pp. 2690-2698, Feb. (Year: 2020).*

"Nonvolatile Electrically Reconfigurable Integrated Photonic Switch Enabled by a Silicon PIN Diode Heater" by Zheng, Adv. Mater., vol. 32, paper 2001218 (Year: 2020).*

Dean, et al.; "Boron nitride substrates for high quality graphene electronics"; Nature Nanotech; vol. 5; pp. 722-726; Jan. 2010; 20 Pages.

Kato, et al.; "Current-driven phase-change optical gate switch using indium-tin-oxide heater"; Appl. Phys. Express; vol. 10; Jun. 26, 2017; 5 Pages.

Li, et al.; "Fast and reliable storage using a 5 bit, nonvolatile photonic memory cell"; Optica; vol. 6; No. 1; Jan. 2019; 6 Pages.

Rios, et al.; "Ultra-compact nonvolatile photonics based on electrically reprogrammable transparent phase change materials"; Jan. 2021; 14 Pages.

Schuler, et al.; "High-responsivity graphene photodetectors integrated on silicon micro-ring resonators"; Nat. Commun.; vol. 12; Jan. 2021; 11 Pages.

Sorianello, et al.; "Graphene-Silicon phase modulators with gigahertz bandwidth"; Nature Photon; vol. 12; pp. 40-44; Jan. 2018; 8 Pages.

Taghinejad, et al.; "ITO-based microheaters for reversible multistage switching of phase-change materials: towards miniaturized beyond-binary reconfigurable integrated photonics"; Opt. Express; OE 29; pp. 20449-20462; Jan. 2021; 24 Pages.

Tuma, et al.; "Stochastic phase-change neurons"; Nature nanotechnology; vol. 11; pp. 693-699; Aug. 2016; 8 Pages.

Waldecker, et al.; "Time-domain separation of optical properties from structural transitions in resonantly bonded materials"; Nature Mater; vol. 14; pp. 991-995; Oct. 2015; 6 Pages.

Wang, et al.; "Gate-variable optical transitions in graphene"; Science; vol. 320; pp. 206-209; Apr. 11, 2008; 4 Pages.

Wang, et al.; "One-Dimensional Electrical Contact to a Two-Dimensional Material"; Science; vol. 342; pp. 614-617; Nov. 1, 2013; 5 Pages.

Youngblood, et al.; "Broadly-tunable smart glazing using an ultra-thin phase-change material"; Jan. 2019; 17 Pages.

Zhang, et al.; "Miniature Multilevel Optical Memristive Switch Using Phase Change Material"; ACS Photonics; vol. 6; pp. 2205-2212; Jan. 2019; 18 Pages.

Zheng, et al.; "GST-on-silicon hybrid nanophotonic integrated circuits: a non-volatile quasi-continuously reprogrammable platform"; Optical Materials Express; vol. 8; pp. 1551-1561; Jun. 2018; 11 Pages.

Zheng, et al.; "Nonvolatile Electrically Reconfigurable Integrated Photonic Switch Enabled by a Silicon PIN Diode Heater"; Advanced Materials; vol. 32; Jan. 2020; 8 Pages.

* cited by examiner 304    306b Backfilling SiO₂

306a Silicon etch

300

302

312    310

SLG transfer and
Al₂O₃ deposition

PCM deposition
314

Al₂O₃ deposition
308

Al₂O₃ deposition    318a Al₂O₃ etch
316

Ti/Au deposition
309

318b

1000

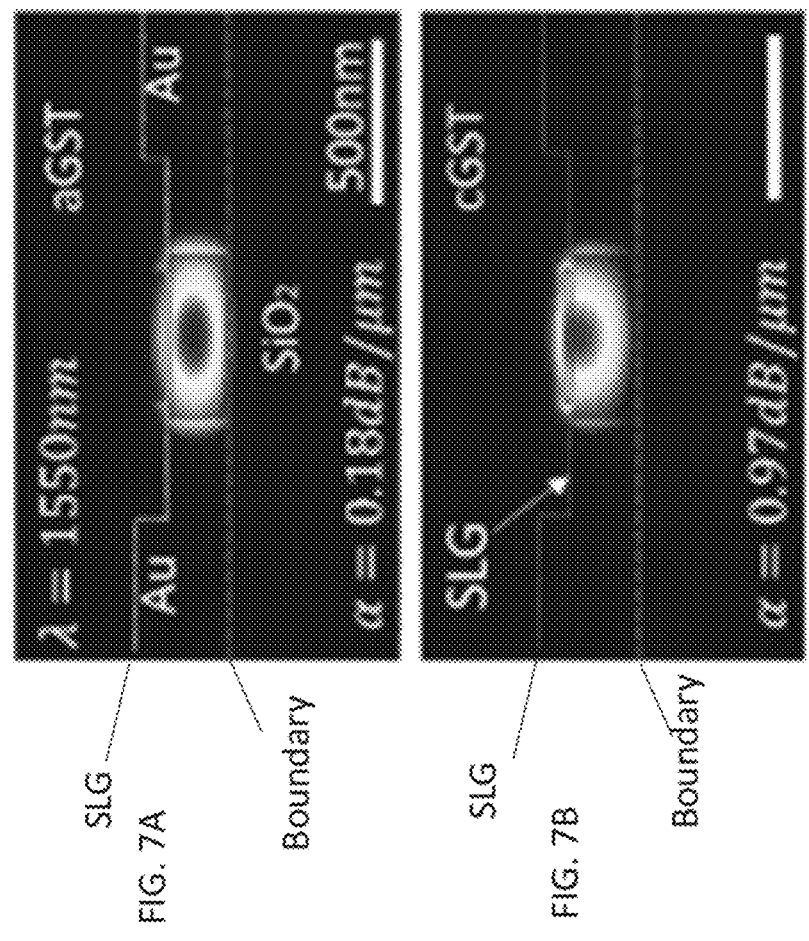

ULTRA-LOW-ENERGY NON-VOLATILE PHASE SHIFTERS

RELATED APPLICATION

The present application claims priority to Provisional Patent Application No. 63/365,135, filed on May 23, 2022, and to Provisional Patent Application No. 63/468,140, filed on May 22, 2023, which are herein incorporated by reference in their entireties.

TECHNICAL FIELD

The present disclosure relates generally to optical photonic platforms that can be employed, for example, as phase shifters and/or optical transmission switches in photonic integrated circuits (PICs).

BACKGROUND

Electro-optic phase shifters and transmission modulators (herein also referred to as transmission switches) can be employed in a variety of critical components of photonic integrated circuits. By way of example, such electro-optic devices can enable dynamic switching and routing of light on chips, comparable to transistors in electronic integrated circuits. Some conventional phase shifters/transmission switches can be actuated via heat.

Conventional phase shifting/transmission switching platforms suffer from several shortcomings. For example, conventional platforms can have a large footprint and/or consume a significant amount of power. Further, the switching speed and the wavelength range over which such conventional devices are operable may limit their use in integrated photonic circuits.

SUMMARY

In one aspect, an integrated photonic device is disclosed, which comprises a waveguide through which radiation having one or more wavelengths within a wavelength band can propagate, a heat-actuable phase change material (PCM) that is optically coupled to the waveguide, and a heater having a layer of a two-dimensional material (herein also referred to as a "two-dimensional layer" or a "2D layer") that is configured for application of a voltage pulse thereto for causing its heating. The two-dimensional layer is in thermal communication with the PCM such that heat transfer from the two-dimensional layer, when heated, to the PCM causes the PCM to undergo a reversible material phase transition between a crystalline state and an amorphous state, thereby causing a change in a refractive index of the PCM and a resultant change in at least one of a phase and transmission of an electromagnetic wave propagating through the waveguide.

In some embodiments, the heater can further comprise a pair of electrically conductive contacts that are electrically coupled to the 2D layer to allow application of the voltage pulse thereto. By way of example, and without limitation, the 2D layer can comprise any material that includes one atomic layer or a few atomic layers (e.g., equal to or less than 20 atomic layers) and exhibits a sheet resistance of equal to or less than about 1 kΩ/sq (kilo ohm per square), e.g., in a range of about 100 f/sq to about 1 kΩ/sq, such as 800 Ω/sq. By way of example, the 2D layer material can include graphene (e.g., a single graphene layer), semi-metals, or doped semiconductors that have the aforementioned characteristics.

The integrated photonic device can comprise a voltage source for generating the voltage pulse for application to the 2D layer. Further, a controller can be in communication with the voltage source to cause the voltage source to generate a voltage pulse having a desired temporal profile for application to the 2D layer. In various embodiments, the controller can cause the voltage source to generate a first voltage pulse for application to the 2D layer, where the first voltage pulse is suitable for causing a material phase transition of the PCM from a crystalline state to an amorphous state. The controller can be further configured to generate a second voltage pulse for application to the 2D layer, where the second voltage pulse is suitable for causing a material phase transition of the PCM from the amorphous state to the crystalline state.

In general, the temporal characteristics of a voltage pulse for causing a material phase transition of the PCM between a crystalline and an amorphous state, such as the voltage pulse duration, the rise time and the decay time of the voltage pulse, can be determined based on the choice of a particular PCM utilized in an integrated photonic device according to various embodiments of the present teachings, including crystallization and amorphization kinetics of different PCM materials. In other words, in various embodiments, the characteristics of the voltage pulse can be defined based on the characteristics of the PCM material using, e.g., experimental and/or theoretical techniques known in the art, as informed by the present teachings.

By way of example, and without limitation, in those embodiments in which the PCM is chosen to be $Sb_2Se_3$, the first voltage pulse can have a temporal duration in a range of about 100 ns (nanoseconds) to about 1000 ns, a rise time in a range of about 1 ns to about 100 ns and a decay time in a range of about 1 ns to about 100 ns and the second voltage pulse can have a temporal duration in a range of about 50 μs (microseconds) to about 500 μs, a rise time in a range of about 1 μs to about 10 μs and a decay time in a range of about 20 μs to about 200 μs.

The above numerical ranges for the various temporal characteristics of the voltage pulses are provided by way of example when the PCM is chosen to be $Sb_2Se_3$. As noted above, in general, the kinetics of amorphization and crystallization of different PCMs can vary in speed by an order of magnitude or more, with some exhibiting a slower and some exhibiting a faster kinetic than that exhibited by $Sb_2Se_3$. In general, the duration of each of the first and the second voltage pulses should be chosen based on the kinetics of the PCM that is employed, the thermal time constant of the device (which can be determined based on the choice of the PCM, the waveguide, the capping and cladding layers, including their respective thicknesses), and the degree of the desired change in the PCM state in response to application of each voltage pulse (e.g., what percentage of the PCM material undergoes the material phase transition).

In some embodiments, the 2D layer can be at least partially disposed above a top surface of the waveguide. In some such embodiments, the 2D layer can be in direct contact with the waveguide while in other embodiments an electrically insulating layer can be positioned between the waveguide and the 2D layer. Further, in some embodiments, the 2D layer can be positioned in contact with, or in proximity of, a side surface of the waveguide, or can extend over the top and one or more side surfaces of the waveguide.

In some embodiments, the waveguide is positioned between the two electrically conductive contacts with the 2D layer forming a bridge over the top surface of the waveguide between the two electrically conductive contacts.

In some embodiments, a first electrically insulating spacer layer separates the 2D layer from a waveguide surface, e.g., a top surface of the waveguide.

In some embodiments, the PCM is positioned above the 2D layer. In some such embodiments, a second electrically insulating spacer layer separates the 2D layer from the PCM.

By way of example, any of the first and second electrically insulating layer can be any of $Al_2O_3$, $SiO_2$, silicon nitride, Hafnia, ZnS, ZnS—$SiO_2$, silicon carbide, and titanium dioxide. In some such embodiments, any of the insulating layers can have a thickness in a range of about 10 μm to about 50 pm.

In some embodiments, the integrated photonic device can comprise an insulating capping layer, which can be formed, for example, from any of $Al_2O_3$, $SiO_2$, silicon nitride, Hafnia, ZnS, ZnS—$SiO_2$, silicon carbide, and titanium dioxide. By way of example, such a capping layer can have a thickness in a range of about 10 μm to about 50 μm.

In various embodiments, the integrated photonic device can operate over a wide wavelength band, e.g., ranging from the visible to the infrared portion of the electromagnetic spectrum. By way of example, the wavelength of the radiation propagating through the waveguide can be in the visible or the infrared (e.g., the near-infrared) portions of the electromagnetic spectrum.

In various embodiments, the heat-actuable PCM can comprise any of antimony sulfide (SbS) and antimony selenide (SbSe), e.g., it can be $Sb_2Se_3$. In general, in various embodiments, the PCM can comprise chalcogenide glasses including sulfides, selenides, or tellurides networked with elements such as Ge, Sb, As, Si, Sn, In, Ag and/or Bi.

In various embodiments, the waveguide of the integrated photonic device can comprise any of silicon, silicon nitride, diamond, silicon carbide, or titanium dioxide. Further, the waveguide can have a variety of profiles, e.g., planar, rib, ridge or slot.

By way of example, the integrated photonic device can operate as a phase shifter for modulating the phase of an electromagnetic radiation propagating through the waveguide and/or operate as a transmission switch for adjusting the transmission level of the electromagnetic radiation.

Further understanding of various aspects of the present teachings can be obtained with reference to the following detailed description in conjunction with the associated drawings, which are described briefly below.

BRIEF DESCRIPTION OF THE DRAWINGS

FIG. 7A and FIG. 7B show simulated fundamental TE mode profiles of a 23-nm GST on a planarized SOI waveguide at 1550 nm.

DETAILED DESCRIPTION

Figure 1A:
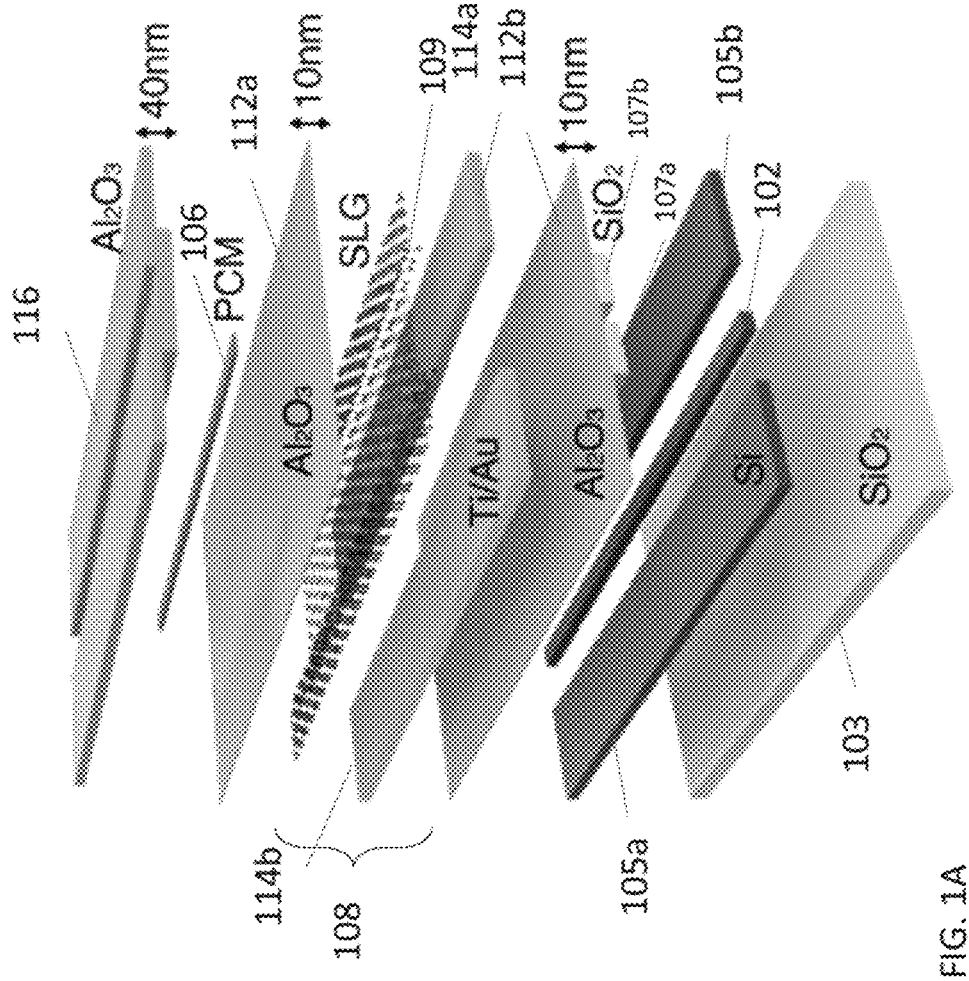
FIG. 1A is an exploded view of an integrated photonic device according to an embodiment of the present invention.

The present disclosure is generally related to phase shifters and transmission switches, and more particularly to heat-actuated phase shifters/transmission switches, for use in photonic integrated circuits. In various embodiments, the phase shifters/transmission switches according to the present invention can improve one or more of the following properties of conventional phase shifters/transmission switches: (1) the amount of energy required to cause a phase shift or transmission switch, (2) the thermal time constant and thus switching of the phase shift or transmission switch, (3) the optical wavelength range(s) over which the devices can operate, (4) compatibility with a variety of photonic material platforms, and (5) reliability of the phase shifters/transmission switches.

The term "integrated photonic device," as used herein, refers to an optical device having one or more components that are disposed on a common substrate.

The term "phase change material," and its abbreviation "PCM," as used herein refers to a material that can transition between two states, e.g., a crystalline state and an amorphous state, in response to application of energy, e.g., heat, thereto.

The term "phase shifter," as used herein, refers to a device, e.g., a component of an integrated photonic device, that can modulate the phase of an electromagnetic radiation passing through a waveguide.

The term "transmission switch," as used herein, refers to a device, e.g., a component of an integrated photonic device, that can modulate transmission of electromagnetic radiation propagating through a waveguide, e.g., as characterized by a change in the transmission level, e.g., the intensity of the transmitted radiation.

The term "wavelength band," as used herein, refers to a continuous group, or a range, of wavelengths with an upper limit and a lower limit.

The term "visible range of the electromagnetic spectrum," and similar terms, as used herein, refer to a wavelength range of about 450 nm to about 750 nm.

The term "infrared portion of the electromagnetic spectrum," and similar terms, as used herein, refer to a wavelength band in a range of about 1 micrometer (micron) to about 25 microns.

The term "near infrared portion of the electromagnetic spectrum," and similar terms, as used herein, refer to a wavelength band in a range of about 1 micron to about 2.5 microns.

The term "optical coupling" and similar phrases, as used herein, refer to an arrangement, e.g., a spatial relationship, between two elements, e.g., a waveguide and a cladding, by which optical energy can be transferred between those elements.

The term "electrically coupled" and similar phrases, as used herein, refer to a direct or an indirect connection between two elements (components) that provide an electrically conductive path between those elements (components).

The terms "evanescent wave" and "evanescent field," which are used herein interchangeably and similar phrases refer to a portion of an oscillating electric and/or magnetic field from a guided mode which is within a region of a medium that is located outside a waveguide core associated with the guided mode. For example, in the case of a waveguide core (such as a silicon waveguide core) with a PCM disposed on its top, some of the field associated with a guided mode extends into the PCM and surrounding cladding. The field extending into the PCM and the surrounding cladding is the evanescent field.

The terms "two-dimensional material" or "two-dimensional heater material" and its abbreviation "2D material" and similar phrases, are used herein to refer to a material composition that is formed of (consists of) one atomic layer or a few atomic layers (e.g., at most 20 atomic layers) and exhibits an electrical sheet resistance of equal to or less than about 1 k$\Omega$/sq, e.g., in a range of about 1 k$\Omega$/sq to about 100 $\Omega$/sq.

The term "temporal duration of a voltage pulse" or "pulse duration," or similar terms refer to a time interval between a reference point on the leading edge of a voltage pulse waveform and a reference point on the trailing edge of the same waveform, e.g., the time interval between two points on the leading and the trailing edges of the waveform, that are at 50% of the peak of the waveform.

The term "rise time of a voltage pulse" and similar terms as used herein refer to a time interval required for the leading edge of a pulse to rise from 10% to 90% to the peak voltage value.

The term "decay time of a voltage pulse" and similar terms as used herein refer to a time interval during which the pulse transitions from its peak voltage value to 10% of the peak.

The term "trailing edge" of a voltage pulse, as used herein, refers to a portion of the voltage pulse that extends from 90% of the peak voltage value to 10% of the peak voltage value.

The term "phase" or "optical phase" of an electromagnetic radiation is used herein in accordance with its common meaning in the art and refers to a fraction of a cycle completed by the periodic oscillation of the electric or the magnetic field relative to the end of a previous cycle. The optical phase associated with a single cycle of oscillation is 360 degrees or $2\pi$ radians.

The term "chalcogenide glass" as used herein refers to a glass containing one or more chalcogens, such as sulfur, selenium and tellurium.

As noted above, phase shifters and transmission switches are utilized in a variety of photonic integrated circuits to enable switching and routing of light. Some conventional phase shifters/transmission switches are heat actuated. Typical heater choices in conventional devices include doped silicon heaters, resistive metal heaters, or transparent oxide heaters. Doped silicon is typically only suitable for use with silicon waveguides or with waveguide materials having an index of refraction that is greater than that of silicon. Further, absorption in silicon limits its use to wavelengths above 1100 nm.

Use of silicon with lower-refractive-index waveguides and for wavelengths below 1100 nm, as well as use of resistive metal heaters in any configuration, requires placing a spacer material between the waveguide and the heater (typically with at least 100 nm thickness) in order to optically isolate the waveguide from the heater. Such a spacer can help minimize the optical loss but it will add to the volume of the device.

Doped Si, metal and Indium-Tin-Oxide (ITO) heaters have significantly higher volumes than heaters based on 2D materials used in various embodiments of the present invention and require a greater energy (e.g., 20×) for causing switching of PCMs than that required by the 2D materials. Further, the use of such conventional heating materials increases the time constant of the heater, which dictates the switching speed of the photonic device. In particular, a high thermal time constant can render reversible switching of PCMs impractical due to a short time constant needed for re-amorphization of some PCMs.

Thus, conventional phase shifters can suffer from several shortcomings, such as their limited suitability for use at shorter wavelengths and high optical loss. For example, Si heaters consume more energy and are not compatible with $Si_3N_4$ waveguides, and not suitable for use at shorter wavelengths, e.g., within the visible and NIR regions of the electromagnetic spectrum. On the other hand, metal heaters can introduce optical loss and/or consume a large amount of energy. Transparent oxide heaters (ITOs) consume large amounts of energy and have relatively poor endurance. High energy consumption by heaters generally leads to a longer thermal time constant and thus a lower switching speed.

In various aspects, the present disclosure describes integrated photonic devices that employ phase change materials to cause modulation of transmission and/or phase of an electromagnetic wave passing through a waveguide. In various embodiments, the present invention allows extending the operating wavelength range of such integrated photonic devices into the near infrared (NIR) (about 780 nm to 2500 nm) and the visible range (about 450 nm to about 780 nm), e.g., by utilizing certain classes of PCMs (such as SbS (antimony sulfide)) and SbSe (antimony selenide) as well as 2D heating materials that provide efficient thermal cycling of the PCMs. In many cases, the PCMs show low optical loss in the visible/NIR electromagnetic wavelength range. Further, such materials, e.g., SbSe, can be switched between a crystalline and an amorphous state repeatedly, thereby allowing the construction of reliable switches.

In various embodiments of the present invention, an integrated photonic device incorporates a new class of phase change materials and a new class of heaters, which are based on 2-D materials, such as graphene. Advantageously, in various embodiments, such a combination enables operation at shorter wavelengths and further results in a reduction of the required energy for PCM switching. Such characteristics allow the use of phase shifters/transmission switches according to various embodiments in a variety of integrated photonic devices.

The phase shifters require a PCM that is highly transparent to the wavelength of the electromagnetic radiation of interest in both the amorphous and crystalline states to allow achieving a change in the optical phase of the propagating electromagnetic radiation with minimal, if any, decrease in the level of transmission. By way of example, in various embodiments, the PCM can exhibit an extinction coefficient in the visible and/or near infrared portions of the electromagnetic spectrum that is equal to or less than about 0.2. Further, in various embodiments, the PCM can exhibit an extinction coefficient that is equal to or less than about 0.01 at a wavelength of 1550 nm.

Transmission switches, in turn, make use of PCMs that exhibit a significant difference in the absorption of the electromagnetic radiation of interest in one material state than in the other. Typically, a PCM suitable for use in transmission switches according to various embodiments exhibit a greater absorption of the electromagnetic radiation in the visible and/or infrared portions of the electromagnetic spectrum in the crystalline state than in the amorphous state. In various embodiments, the transmission switches are designed to optimize the difference in the transmission level of the electromagnetic radiation between the two states. By way of example, the change in the transmission level between the two states can be in a range of about 10 dB to about 25 dB.

Silicon photonics is evolving from laboratory research to real-world applications with the potential to transform many technologies, including optical neural networks and quantum information processing. A key element required for such applications is a reconfigurable switch that is capable of operating at an ultra-low programming energy, which is difficult to achieve with traditional thermo-optic or free carrier effects. Further, although recent advances in non-volatile programmable silicon photonics based on phase-change materials can provide energy-efficient photonic switches with zero static power, but their programming energy density remains high (e.g., it can be in the range of hundreds of nJ/nm³).

As discussed in more detail below, in various embodiments, 2D materials are employed as a heating material (heater) for causing the transition of the PCM material between an amorphous and a crystalline state. The use of such 2D materials as heaters provides a variety of benefits. For example, graphene is compatible with Si, Si₃N₄ and other photonic material platforms.

In some embodiments, a nonvolatile electrically reconfigurable, hybrid PCM-silicon photonic platform is disclosed, which employs a monolayer graphene heater with an ultra-low programming energy density (8.7±1.4) and high endurance (≥1,000 cycles)—within an order of magnitude of the fundamental limit (about 1.2 nJ/nm³).

In particular, as discussed in more detail below, an ultra-compact broadband transmission waveguide switch covering the whole telecommunication C-band based on absorption modulation using Ge₂Sb₂Te₅ was fabricated, which was only 4.73 μm long and operated at CMOS-driving current (≤2.78 mA) and volage (≤5 V).

Further, low-loss PCM Sb₂Se₃ was employed to fabricate a graphene-assisted phase shifter using a microring resonator that supported 14 distinct optical phase levels, as described in more detail below.

Without being limited to any particular theory, the high thermal conductivity and ultra-low heat capacity of atomically thin graphene allows drastically reducing the thermal mass for the triggering of phase transition of a phase change material, resulting in a high energy efficiency. In various embodiments, integrated photonic platforms are disclosed based on the use of graphene and other 2D-based heaters for switching the material phase of PCMs, e.g., causing a transition between a crystalline and an amorphous state. It is noted that a graphene heater can be transferred to a variety of wide-bandgap substrates, such as Si₃N₄.

In various embodiments, the PCM-based phase shifters and transmission switches according to the present invention require significantly less energy for switching than that required in conventional systems. Further, the heater technology employed in various embodiments of the present invention for causing phase and/or transmission switching of an electromagnetic wave propagating through a waveguide of a photonic device can be employed in a wide variety of photonic materials platforms. Further, a low volume of such heaters can minimize the energy required to switch the PCM between a crystalline and an amorphous state as a greater portion of the input energy can be used for switching the state of the PCM, rather than raising the temperature of the heater and the surrounding material. Further, the 2D materials employed in various embodiments for heating the PCM can exhibit excellent endurance and minimal optical loss.

Figure 1B:
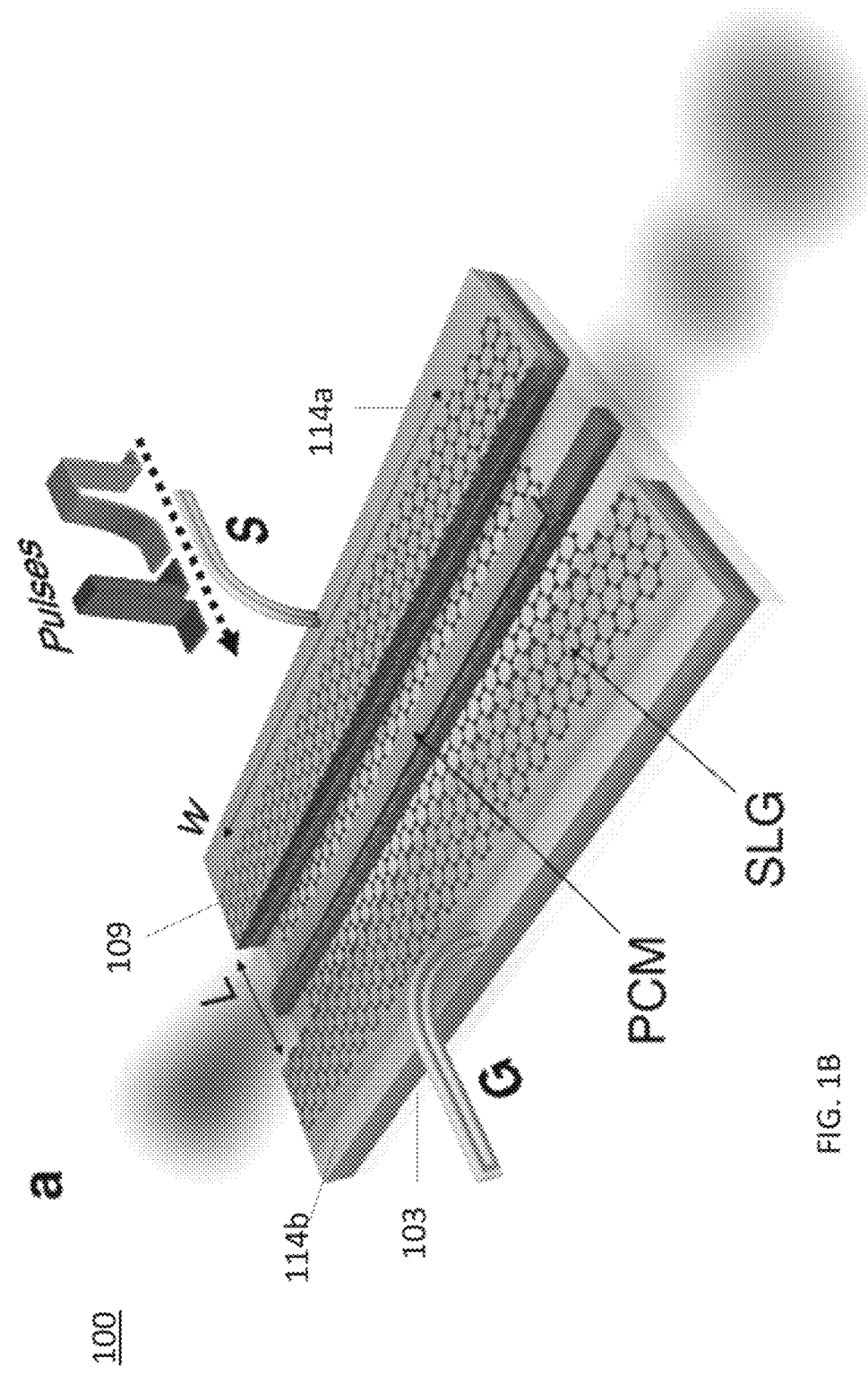
FIG. 1B is a schematic perspective view of the integrated photonic device shown in FIG. 1A.
Figure 1C:
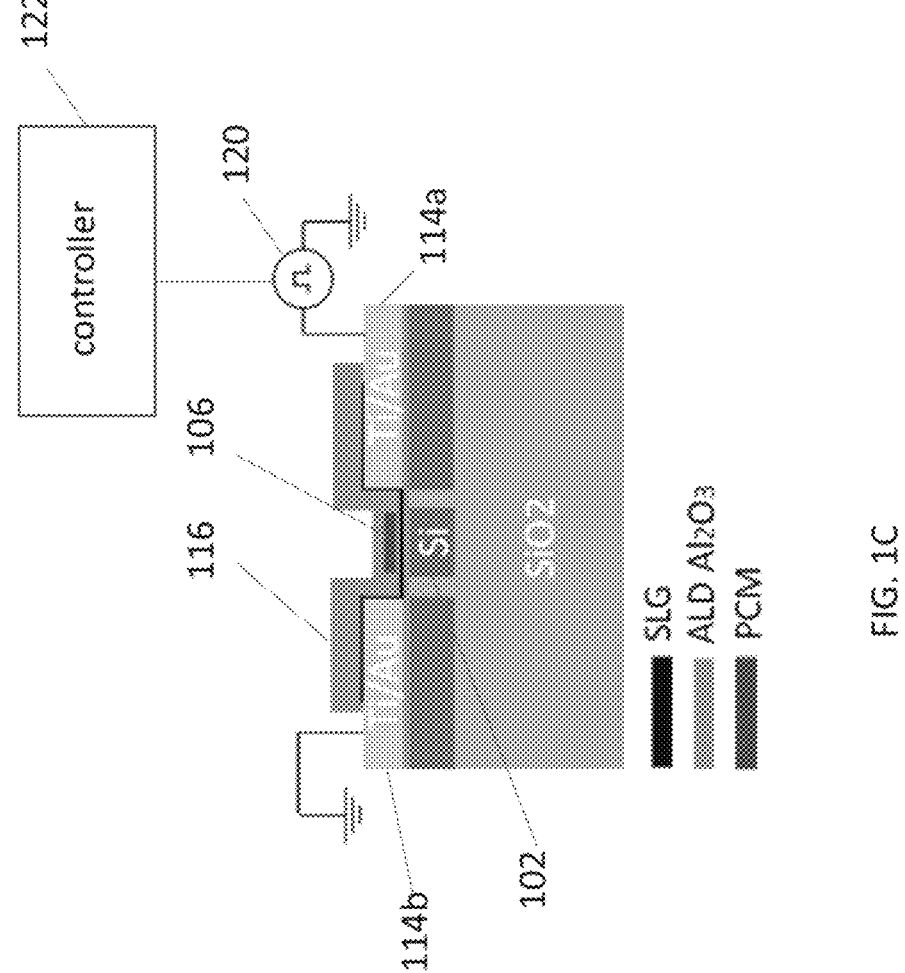
FIG. 1C is a schematic perspective view of the integrated photonic device shown in FIG. 1A.

With reference to FIGS. 1A, 1B and 1C, an integrated photonic device 100 (herein also referred to as an integrated photonic switch) according to an embodiment includes a waveguide 102 through which radiation having wavelengths within a wavelength band of interest can propagate. By way of example, the wavelength band can include the visible and/or the near infrared portions of the electromagnetic spectrum. In this embodiment, the waveguide 102 is formed as a silicon layer that is disposed over an underlying SiO₂ substrate 103. The silicon waveguide layer 102 is flanked by two silicon layers 105a/105b, where the waveguide layer 102 is separated from the flanking layers by two trenches in which two SiO₂ layers 107a/107b are disposed.

By way of example, and without limitation, the width and the height of the waveguide 102 can be, respectively, in a range of about 150 nm (nanometers) to about 3000 nm and a range of about 50 nm to about 1000 nm. In some applications, a waveguide thickness in a range of about 50 to about 300 nm may be preferable. Further, in various embodiments, the PCM is selectively patterned on the top surface of the waveguide.

The photonic switch 100 further includes a layer 106 of a phase-change material (PCM), which is disposed over a top surface of the waveguide 102 and is in optical coupling with the waveguide 102. By way of example, in various embodiments, the PCM can be optically coupled to the waveguide via evanescent optical coupling. In some embodiments, the PCM can form a cladding layer of at least a portion of the waveguide.

In various embodiments, the PCM can include classes of compounds based on SbS (antimony sulfide) and SbSe (antimony selenide). These classes of compounds advantageously exhibit a low optical loss in the visible and the NIR portions of the electromagnetic spectrum. Further, such compounds can be switched in a repeatable manner between crystalline and amorphous states, thus allowing their use as a core component of an active photonic switch, as discussed in more detail below.

In this embodiment, the photonic switch 100 also includes a heater 108 for modulating the temperature of the PCM between a high and a low temperature so as to modulate a refractive index of the PCM and hence modulate the phase and/or transmission level of the radiation propagating through the waveguide 102. In this embodiment, the heater includes a single-layer graphene (SLG) sheet 109 that is sandwiched between two spacer Al₂O₃ layers 112a/112b. In other embodiments, other 2D materials, such as those disclosed herein, may be utilized.

In this embodiment, each of the Al₂O₃ layers has a thickness of about 10 nm, though other thicknesses may also be utilized. More generally, the thickness of the Al₂O₃, or another electrically insulating material employed as a spacer, can be, for example, in a range of about 10 to about 50 nm. In various implementations, the encapsulation of the SLG 109 between the two Al₂O₃ layers can protect the SLG 109 from rupture due to tension caused by the volume expansion and contraction of the PCM upon switching. In other embodiments, such insulating layers may not be employed and the SLG 109 may be in direct contact with the PCM.

The heater 108 further includes a pair of electrically conductive contacts 114a/114b (herein also referred to as electrically conductive pads) that are deposited on the SLG 109 to allow application of a voltage pulse across the SLG 109 to cause heating thereof. A transfer of heat from the heated SLG 109 to the PCM 106, which is in thermal communication with the SLG 109, can cause heating of the PCM 106 and thereby change a material phase of the PCM 106 and hence its refractive index, e.g., by causing a transition of the PCM 106 between a crystalline and an amorphous state. In this embodiment, each of the conductive contacts 114a/114b is formed as a layer of Ti (titanium) on which a layer of Au (gold) is deposited.

With continued reference to FIGS. 1A and 1B, in this embodiment, a top Al₂O₃ layer 116 functions as an encapsulation layer for both the PCM layer 106 and the SLG 109. By way of example, in various embodiments, the encapsulation layer 116 can prevent oxidation of the waveguide material and/or the PCM and can further prevent the reflowing of the PCM material during switching.

Figure 2:
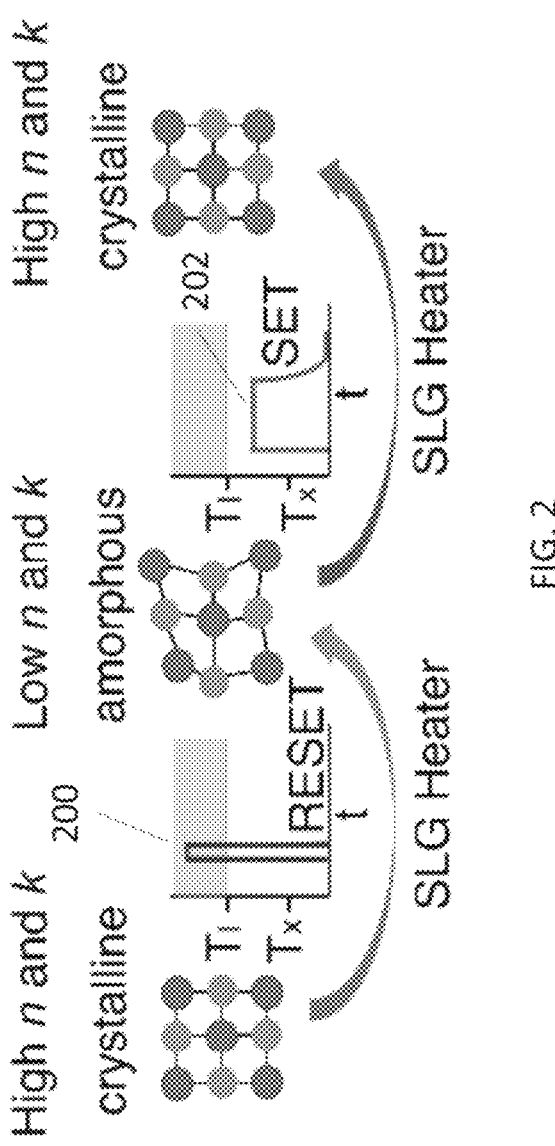
FIG. 2 is a schematic diagram illustrating examples of RESET and SET pulses and the transition of the PCM between crystalline and amorphous states, FIGS. 3A-3H schematically depict various stages of a fabrication process according to an embodiment of the present invention for fabricating the integrated photonic device illustrated in FIG. 1A.
Figures 3A, 3B, 3C, 3D, 3E, 3F, 3G, 3H:
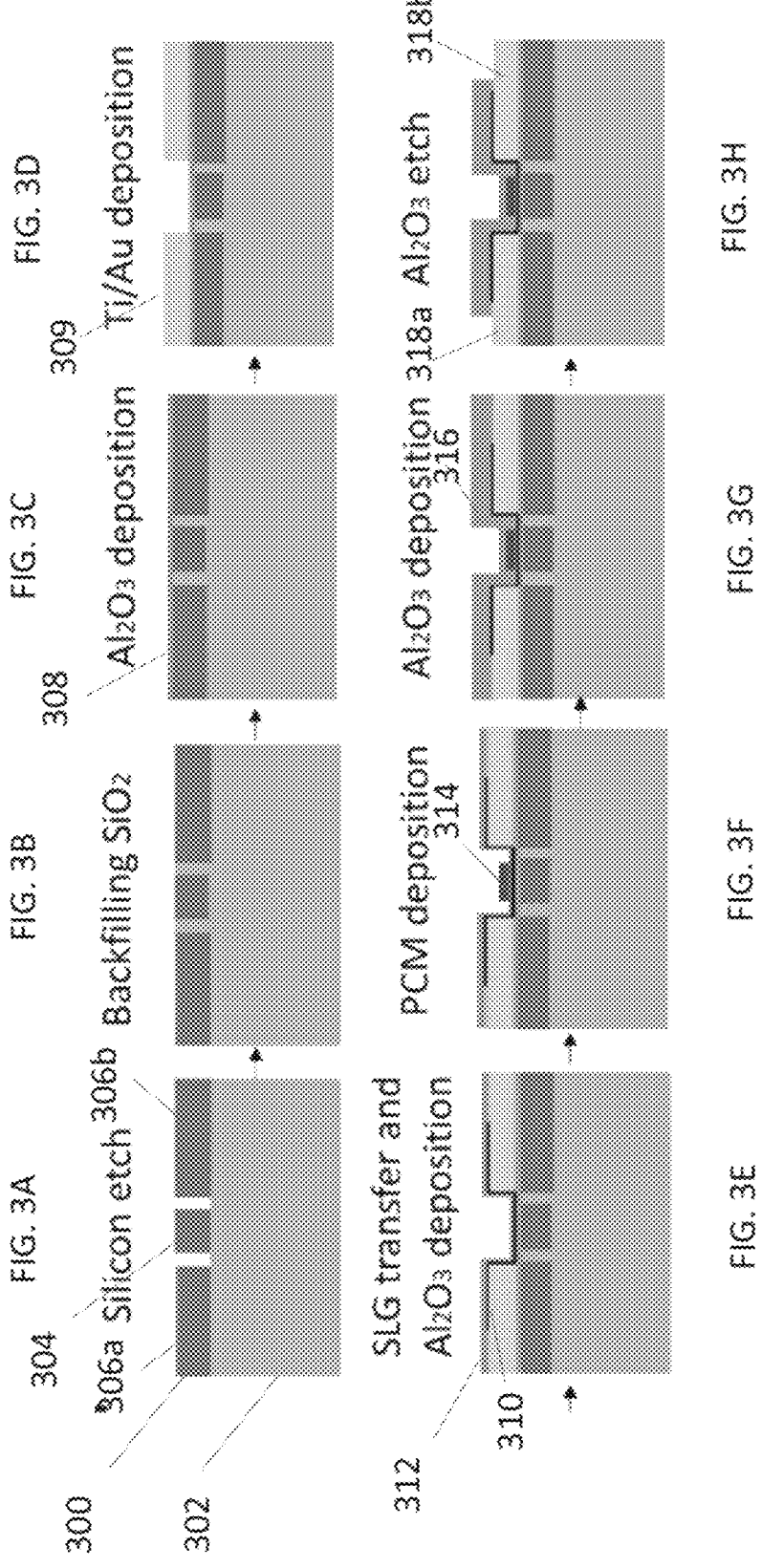

With continued reference to FIGS. 1A, 1B as well FIG. 2, in use, the temperature of the graphene layer 109 and hence that of the PCM layer 106, which is in thermal contact with the graphene layer 109, can be modulated, e.g., via application of electrical voltage pulses to the graphene layer. In various embodiments, the modulation of the temperature of the PCM layer 106 can lead to transition of that layer between a crystalline state and an amorphous state with the concomitant change in the refractive index of the PCM layer, which can in turn lead to a change in transmission and/or the phase of an electromagnetic wave propagating through the waveguide.

More specifically, the application of a high amplitude, temporally short excitation voltage pulse 200 (which is herein referred to as a "RESET" pulse), via the electrically conductive contacts 114a/114b, to the graphene layer can result in heating of the graphene layer and the PCM 106, via its thermal coupling to the graphene layer, above its melting temperature Ti. The melting of the PCM 106 is followed by rapid quenching of the heating via the removal of the excitation voltage pulse. By way of example, in various embodiments, the RESET voltage pulse for application to an Sb$_2$Se$_3$ photonic device according to the present invention can have an amplitude in a range of about 5 to about 20 volts and a temporal duration in a range of about 100 ns to about 1000 ns.

The melt-quench operation induces amorphization of the PCM layer 106 and transforms the PCM layer (or at least a portion thereof) into a lower refractive index state for propagation of the electromagnetic radiation through the waveguide. As noted above, in various embodiments in which the photonic device is designed to be employed as a phase shifter, the PCM is selected to be as transmissive as possible for the radiation wavelength of interest in both the crystalline and amorphous states. On the other hand, in various embodiments in which the photonic device is designed to be employed as a transmission switch, the PCM is selected to undergo a transition between an opaque state (typically in a crystalline phase) and a transparent state (typically in an amorphous phase) at a wavelength (or within a wavelength band of interest) as the PCM changes its material phase.

Without being limited to any particular theory, an electromagnetic wave passing through the waveguide can couple, e.g., via evanescent coupling, to the PCM layer 106. As such, a change in the refractive index of the PCM layer can change the mode profile of the waveguide and affect the transmission and/or the phase of the electromagnetic wave as it propagates through the waveguide. For example, a change in the real portion of the refractive index of the PCM can modulate the phase of the electromagnetic wave and a change in the imaginary portion of the refractive index of the PCM can modulate the transmission level of the electromagnetic wave propagating through the waveguide via modulation of the absorption of the propagating radiation. Further, changes in both the real and imaginary portions of the PCM's refractive index an affect both the phase and the transmission of the electromagnetic wave propagating through the waveguide.

In order to restore the PCM layer 106 into a crystalline state, a low amplitude voltage pulse with a longer temporal duration than that of the RESET pulse can be applied via the electrical contacts to the graphene layer. By way of example, such a pulse (which is herein also referred to as a "SET" pulse) for application to an Sb$_2$Se$_3$ PCM can have an amplitude in a range of about 5 volts to about 8 volts and a temporal duration in a range of about 50 μs to about 500 μs, a rise time in a range of about 1 μs to about 10 μs, and a decay time in a range of about 20 μs to about 200 μs. As noted above, the kinetics of amorphization and crystallization of different PCMs can vary in speed by an order of magnitude or more, with some slower and some faster than that exhibited by Sb$_2$Se$_3$. In various embodiments, the first and the second voltage pulse durations can be selected based on the kinetics of the PCM that is employed for incorporating into the integrated photonic device, the thermal time constant of the device (determined by the choice of the PCM, the waveguide, the capping and the cladding layers and their thicknesses), and a desired degree of change of the PCM state in response to the application of the voltage pulses.

For example, the SET pulse depicted schematically in FIG. 2 exhibits a sharp rise to a maximum voltage value that remains substantially constant for a time period of t$_1$ followed by a trailing edge that is characterized by a slow decrease of the voltage to zero.

The SET pulse can cause heating of the PCM, via heat transfer from the heated graphene layer, to an elevated temperature above its crystallization temperature (Tx) and below its melting temperature. The long trailing edge of the SET pulse ensures slow cooling of the PCM to achieve its crystallization. The crystallization of the PCM layer 106 restores the refractive index of PCM layer to its crystalline value, which is typically higher than the refractive index associated with the amorphous state. The difference between the indices of refraction of the amorphous and the crystalline states enables tuning the effective refractive index (n$_{eff}$) of the propagating mode in the waveguide via its evanescent wave interaction with the PCM. The difference in the refractive index (Δn$_{eff}$) multiplied by the path length of the propagating radiation produces an optical phase shift of the propagating radiation. In various embodiments, in such a phase shifter, both the crystalline and the amorphous states of the PCM are highly transmissive at the operating wavelength of the device. By way of example, SbSe and SbS are two types of materials that exhibit a high transmission throughout the short-wave infrared region of the electromagnetic spectrum into the near infrared region. PCMs with sufficiently high changes in their absorption of radiation in a desired operating wavelength band (or wavelength) can enable modulation of the intensity of the electromagnetic radiation passing through the waveguide in one state relative to another state. Such transmission switches are typically optimized to maximize the level of transmission between the switch states.

Referring again to FIG. 1C, the integrated photonic device can include a voltage source 120 that is in electrical communication with the electrically conductive contact 114a for application of a voltage pulse to the graphene layer 109. A controller 122 in communication with the voltage source 120 can control the operation of the voltage source so that the voltage source would apply an amorphization or a crystallization voltage pulse to the graphene layer. The controller 122 can be implemented in hardware, firmware and/or software in a manner known in the art as informed by the present teachings. For example, the controller can include a processor, one or more memory modules and one or more communication buses for allowing communication between various components of the controller. By way of example, instructions for operating the voltage source can be stored in a permanent memory module of the controller and can be transferred to a transient memory module for execution during run-time.

With reference to FIGS. 3A-3H, an example of a method for fabricating the photonic switch 100 includes depositing a photoresist layer on a silicon layer 300, which is deposited on top of a buried silicon oxide layer 302. The photoresist layer is patterned using electron-beam lithography (EBL) followed by etching the exposed portion of the silicon to generate a silicon waveguide 304 separated from two flanking silicon layers 306a/306b by two trenches. Prior to the removal of the patterned photoresist layer, $SiO_2$ is evaporated onto the resist-coated silicon layer by electron beam evaporation. The lift-off of $SiO_2$ can then be achieved, for example, via sonication in methylene chloride, which leads to the formation of planarized waveguides. A thin layer of $Al_2O_3$ 308 can then be grown on the substrate, e.g., via atomic layer deposition (ALD), to prevent the formation of semiconductor and metal junction between the graphene and silicon. Another EBL exposure using a positive tone resist can be carried out to create windows for Ti/Au deposition. After development, a layer of Ti followed by a layer of Au can be evaporated onto the chip. The Ti/Au layer 309 deposited on the photoresist can undergo lift-off, e.g., by immersing the chip in methylene chloride.

A monolayer of graphene 310 grown by chemical vapor deposition (CVD) can be transferred onto the chip by standard techniques (e.g., PMMA wet transfer) and then patterned with EBL. The graphene that is not protected by the resist can be etched away followed by deposition of another $Al_2O_3$ 312 layer to protect the graphene layer during subsequent fabrication steps.

Subsequently, a PCM layer 314 can be deposited on the $Al_2O_3$ 312. This can be followed by the deposition of a capping layer of $Al_2O_3$ 316 on the PCM layer 314. Portions of the $Al_2O_3$ 316 layer can be removed, e.g., via etching, to expose portions of the underlying Ti/Au layer 309 to be utilized as electrical contacts for application of the RESET and SET voltages to the graphene layer.

Figure 4A:
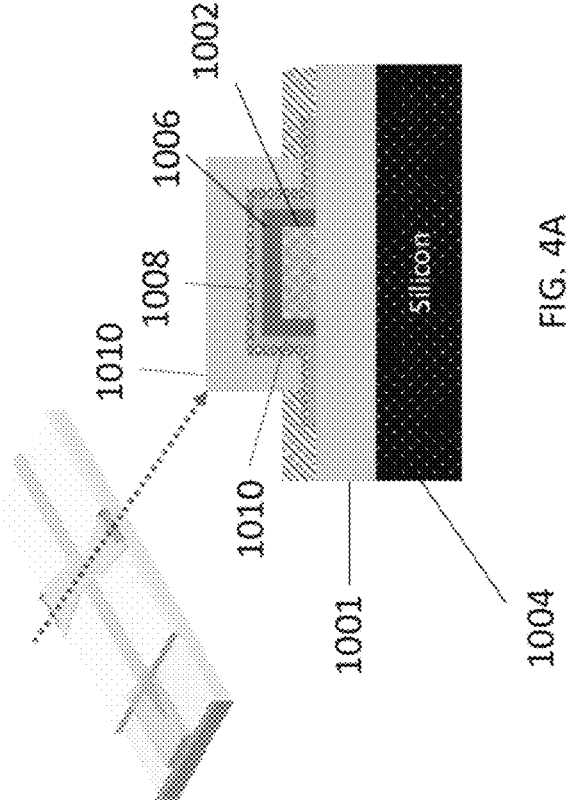
FIG. 4A is a schematic view of an integrated photonic device according to another embodiment of the present invention.

FIG. 4A schematically depicts an integrated photonic device 1000 according to another embodiment, which includes a nitride waveguide 1002 that is deposited over an $SiO_2$ layer 1001, which is in turn disposed on an underlying silicon substrate 1004. A PCM layer 1006 is disposed over the waveguide 1002 such that the PCM layer 1006 is in direct contact with the waveguide 1002 and covers the top and the side surfaces of the waveguide. By way of example, the PCM layer 1006 can be formed of SbS or SbSe materials, such as those disclosed herein. The integrated photonic device 1000 further includes a 2D material layer 1008 that can function as a heater layer for causing a material phase change of the PCM layer 1006 between a crystalline and an amorphous state. By way of example, the 2D layer can be formed of graphene or ITO or any other suitable 2D material having the characteristics discussed above. In this embodiment, an alumina layer 1010 separates the 2D heater layer 1008 from the PCM layer 1006. By way of example, the thickness of the alumina layer 1010 can be in a range of about 10 nm to about 50 nm. In other embodiments, rather than alumina, other electrically insulating layers, such as those disclosed above, may also be utilized for forming the layer 1010. Two electrically conductive pads 1012a/1012b (herein also referred to as electrically conductive contacts) are deposited on a portion of the silicon oxide layer such that each of the pads is in electrical contact with a portion of the heater layer 1008. In this embodiment, the electrically conductive pads can be formed as three stacked layers of Chromium (Cr), platinum (Pt), and gold (Au). The electrical contacts can be utilized to apply voltage pulses to the 2D heater layer, e.g., via a voltage source operating under the control of a controller as discussed above, so as to cause heating of that layer and consequently cause the heating of the PCM layer via heat transfer from the 2D heater layer. In this embodiment, an $SiO_2$ capping layer covers the 2D heater layer.

In use, the phase or the amplitude of an electromagnetic wave propagating through the waveguide 1002 can be adjusted via causing a material phase transition of the PCM layer between a crystalline and an amorphous state via application of voltage pulses to the 2D heater layer in a manner disclosed herein.

Figure 4B:
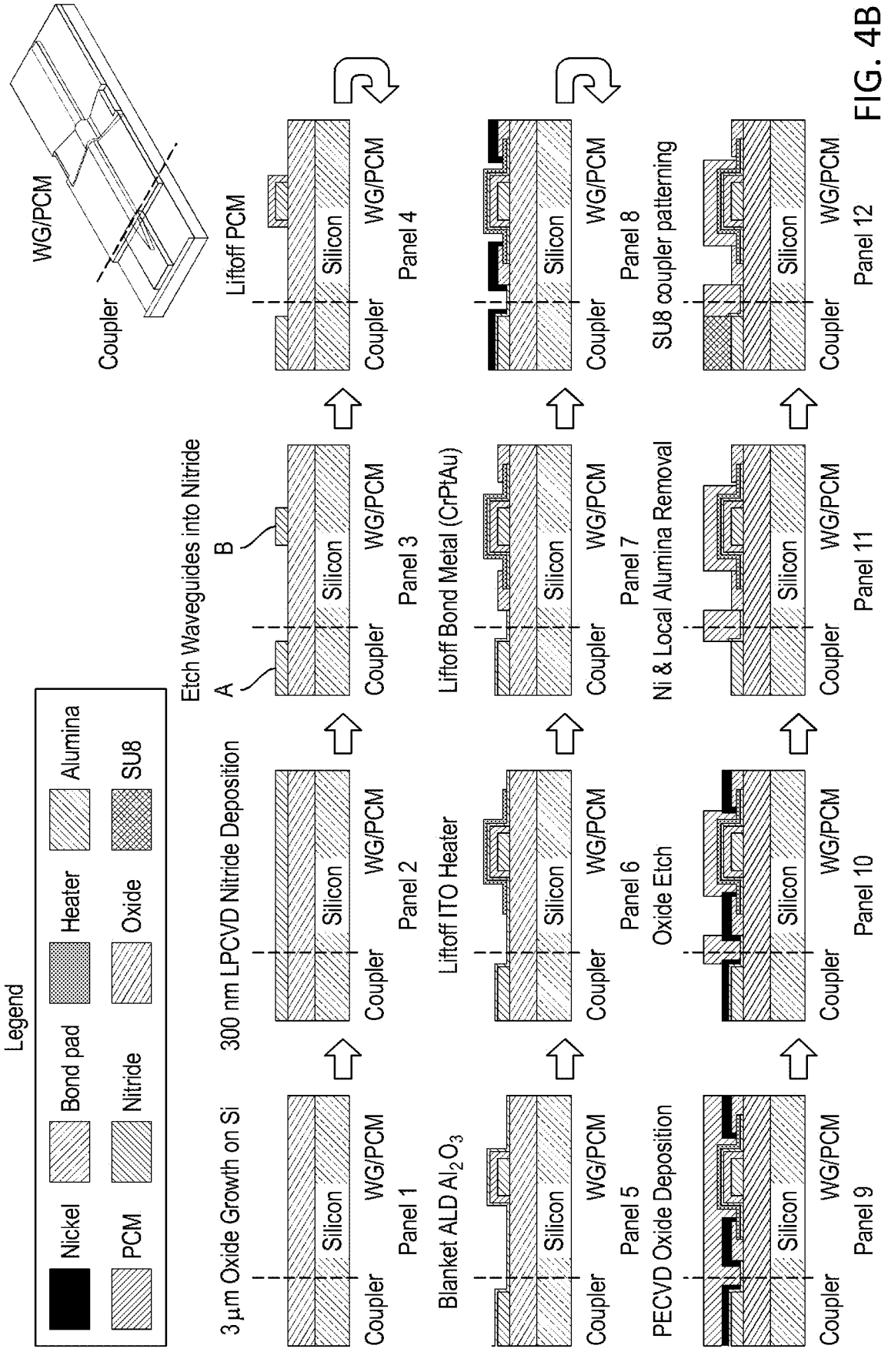
FIG. 4B depicts various stages of a fabrication process according to an embodiment of the present invention for fabricating the integrated photonic device illustrated in FIG. 4A.

FIG. 4B schematically depicts an example of a fabrication method for fabricating the integrated photonic device 1000 discussed above. In the panels of this image the simultaneous patterning of the edge coupler region and PCM region are both summarized, separated by a dashed line. In an initial step (Panel 1), an $SiO_2$ layer having a thickness of 3 microns is grown on an underlying silicon layer, e.g., via oxidation of the silicon layer. Subsequently, a 300-nm thick nitride layer is deposited on the $SiO_2$ layer via LPCVD (Panel 2). The nitride layer is lithographically masked and etched to form the waveguide layer (Panel 3). A layer of PCM, e.g., $Sb_2Se_3$. is deposited and portions of it are lifted off such that the PCM layer covers the top and the side surfaces of the waveguide portion A (Panel 4).

A blanket layer of $Al_2O_3$ is deposited over the surface (Panel 5) and subsequently, an ITO heater layer is then deposited and portions of it lifted off to generate the ITO heater layer shown in Panel 6. The conductive bonds are formed via deposition of Cr, Pt and Au layers and selectively removing the extra portions of the deposited metal layer via a lift-off process (Panel 7). A protective nickel (Ni) layer can be deposited over the surface and patterned as shown in Panel 8. Subsequently, a silicon oxide layer is deposited over the surface and etched (See, Panels 9 and 10). The nickel and alumina are selectively removed, via a lift off process, to generate the device depicted in Panel 11. An SU8 resin layer is deposited and patterned to generate an SU8 coupler, as shown in Panel 12. The following examples are provided for further elucidation of various aspects of the present invention and are not provided to indicate necessarily optimal ways of practicing the present invention and/or optimal results that may be achieved.

EXAMPLES

In the following examples, the fabrication and characterization of examples of photonic switches, including a transmission waveguide switch and a phase shifter according to various embodiments are described. The following device fabrication steps were utilized for the fabrication of these photonic switches.

Device Fabrication:

The graphene-PCM photonic switches were fabricated on a 220-nm thick silicon layer on top of a 3-μm thick buried oxide layer (SOITECH). The fabrication flow schematically depicted in FIGS. 3A-3H was utilized for the device fabrication.

The pattern was defined by a JEOLJBX-6300FS 100 kV electron-beam lithography (EBL) system using positive tone ZEP-520A resist. 220-nm fully etched ridge waveguides were made by an inductively coupled plasma reactive ion etching (ICP-RIE) process in Fluorine-based gases. Before removing the resists, a 220-nm, $SiO_2$ layer was evaporated onto the resist-coated waveguides by electron beam evaporation. The lift-off of the $SiO_2$ layer was completed by a 3-minute sonication in methylene chloride, which led to the formation of planarized waveguides. 10 nm of atomic-layer-deposited $Al_2O_3$ was then grown on the substrate to prevent the formation of semiconductor and metal junction between the graphene and silicon.

A second EBL exposure using positive tone poly(methyl methacrylate) (PMMA) resist was subsequently carried out to create windows for the Ti/Au deposition. After development, a 5-nm Ti layer followed by 100-nm Au layer were electron beam evaporated onto the chip. The lift-off of Ti/Au was completed again by immersing the chip in methylene chloride. Monolayer graphene (acquired from Graphenea) grown by chemical vapor deposition (CVD) was transferred onto the chip by the standard PMMA wet transfer technique and then patterned with EBL using the maN 2403 negative resist.

Figure 25:
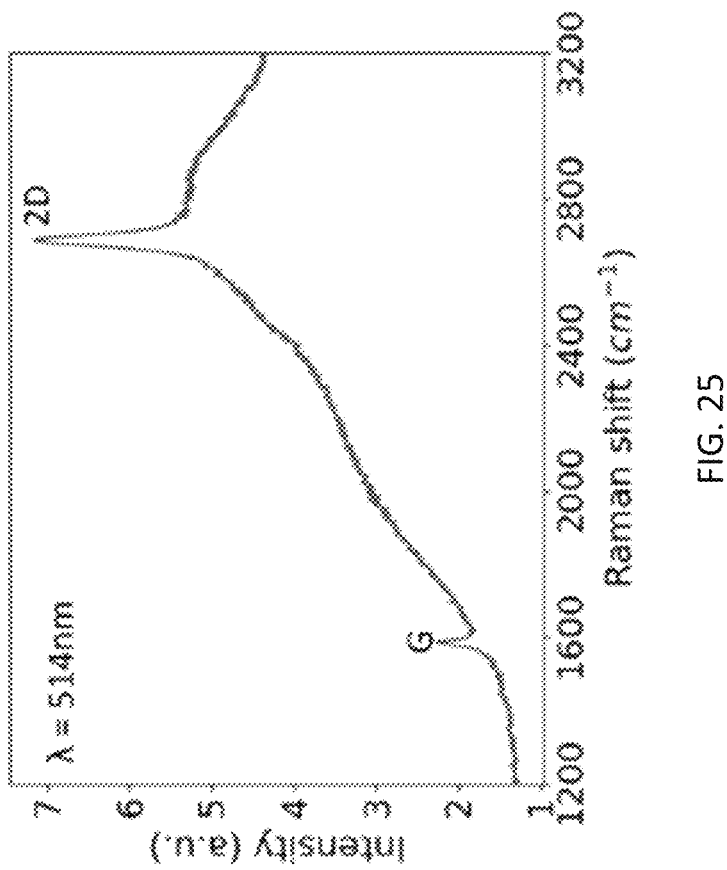

$O_2$ plasma was used to etch away the graphene that was not protected by the resist followed by ALD deposition of another 10-nm $Al_2O_3$ capping layer to protect the graphene during the subsequent fabrication steps. The high quality of the transferred graphene on the fabricated devices was confirmed by Raman spectroscopy. By way of illustration, FIG. 25 shows the Raman spectrum measured at the graphene region on the fabricated devices. A 514-nm wavelength laser at 1 mW was used. No defect-related peaks (D, D' or D+G) was observed, indicating that the subsequent fabrication after graphene transfer, including ALD, did not introduce structural defects into graphene. The absence of a graphene oxide peak near 1300 $cm^{-1}$ shows that ALD Alumina growth did not induce oxidation to the graphene.

The $5^{th}$ EBL overlay step was used to expose the PMMA resist before depositing GST or $Sb_2Se_3$ via magnetron sputtering. Specifically, a 23 nm layer of GST was deposited via magnetron sputtering (Lesker Lab 18) using a GST target at 28 W DC power and a base pressure of ~$5\times10^{-7}$ Torr. The Ar flow rate was controlled to maintain a sputtering pressure of 3.5 mTorr. The $Sb_2Se_3$ was sputtered using a magnetron sputtering system at 30 W RF power under a deposition pressure of 4 mTorr and Ar flow of 30 sccm. The deposition rate for $Sb_2Se_3$ was about 1 nm/min. Additionally, the samples were capped with 10 nm of $SiO_2$ sputtered in situ (150 W RF power, 4 mTorr pressure, and Ar flow of 30 sccm), to prevent oxidation during sample shipping.

Several pre- and post-deposition treatments of the sputtering chamber were performed for the selenide deposition, including cleaning the chamber followed by annealing and $O_2$ plasma cleaning. Prior to $Sb_2Se_3$ deposition, the sputtering chamber was baked at 400° C. for 6 hours (under vacuum) followed by cooling down the chamber to room temperature to drive out gases and other contaminants. The toxic residual hydrogen selenide formed during $Sb_2Se_3$ deposition was removed by running an oxygen plasma for 1 hour prior to opening the sputtering chamber. The atomic ratio of $Sb_2Se_3$ after deposition was confirmed using XPS to be Sb:Se≈44:56, which is close to the sputtering target stoichiometry of Sb:Se≈40:60.

Immediately after lifting off the PCM in methylene chloride, a 40-nm ALD $Al_2O_3$ was grown on the chip to protect the PCM from oxidation and reflowing during switching. To allow good electrical contacts between the probes and the metal pads, the $6^{th}$ EBL step was used to open windows in the PMMA resist at the contact regions for $Al_2O_3$ etching.

The $Al_2O_3$ on top of the contacts was etched away using ICP-RIE etching in Chlorine-based gases. Finally, the PCMs were initialized into the fully crystalline state by rapid thermal annealing (RTA) at 200° C. for 10 min under $N_2$ atmosphere before measurements. The patterned graphene did not peel off after subsequent fabrication steps, presumably because it was protected by the 10-nm ALD Alumina.

Experimental Setup and Measurements

Figure 4C:
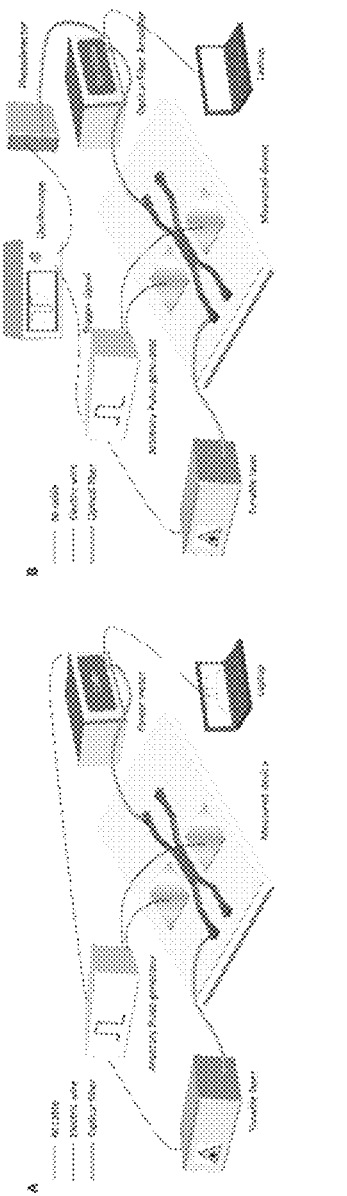
FIG. 4C illustrates a schematic view of a vertical fiber-coupling setup that was employed to characterize prototype waveguides and microring resonators fabricated in accordance with various embodiments of the present invention.

The waveguides and microrings were characterized by a vertical fiber-coupling setup, schematically depicted in FIG. 4C. All the measurements were performed under ambient conditions while the temperature of the stage was fixed at −26° C. by a thermoelectric controller (TEC, TE Technology TC-720) to prohibit any significant thermal shift of the resonators, which could interfere with the measurement process. The input light was provided by a tunable continuous-wave laser (Santec TSL-510) with the polarization of the laser light controlled by a manual fiber polarization controller (Thorlabs FPC526) to match the fundamental quasi-TE mode of the waveguides.

A low-noise power meter (Keysight 81634B) was used to collect the static optical output from the grating couplers. The transmission spectrum measurement was performed after the fabrication of bare microrings, deposition of metal, transfer of SLG, and deposition of $Sb_2Se_3$ respectively to extract change in optical losses in each step. For electrical characterizations, the electrical signals were applied to the metal contacts by a pair of DC probes controlled by two probe positioners (Cascade Microtech DPP105-M-AI-S). The voltage sweep and current measurement were provided by a source meter (Keithley 2450). The generated I-V curves were used to estimate the power of the applied pulses. The SET and RESET pulses were generated from a pulse function arbitrary generator (Keysight 81150A). To reconfigure the graphene-GST photonic switch, a voltage pulse having an amplitude of 5V (2.78 mA), a pulse width of 400-ns and 8-ns rising/trialing edge was used to induce the amorphization of the PCB material. For crystallization, a voltage pulse of 3V (1.79 mA), 100-μs pulse width, and 120-μs trailing edge was used. To reconfigure the graphene-$Sb_2Se_3$ phase shifter, a voltage pulse of 6.8V (3.4 mA), 400-ns pulse width, and 8 ns rising/trialing edge was used to induce the amorphization. For crystallization, a voltage pulse of 4 V (2.0 mA), 100-μs pulse width, and 120-μs trailing edge was used.

The voltage was the actual voltage applied across the device as the impedance was matched by setting the load impedance of the function generator to the measured total resistance of the device from the I-V curve. The maximum current the graphene can withstand is typically around 3 mA. To perform the endurance test shown in FIG. 18 and discussed further below, the laser wavelength was initially parked near the resonance which resulted in a larger optical contrast. The subsequent drift of the laser wavelength from the resonance wavelength led to a simultaneous increase of transmission in both states and a slightly decreased contrast. The data was filtered by a 50-point moving average to reduce fluctuation caused by thermal noises. Resonance drift of high-Q resonator due to temperature variation in the surrounding is not uncommon and is believed to be due to the relatively strong thermo-optic effect of silicon and integrated metallic heaters near the resonators, which are normally used to stabilize the temperature.

To measure the transient response of the switch, the output light from the grating couplers was amplified by an optical fiber amplifier (Amonics AEDFA-30-B-FA) and the amplified signal was detected by a 150 MHz near IR fast photoreceiver (Thorlabs PDB450C) connected to an oscilloscope.

Broadband Waveguide Amplitude-Modulation Switch

Figures 5A, 5B:
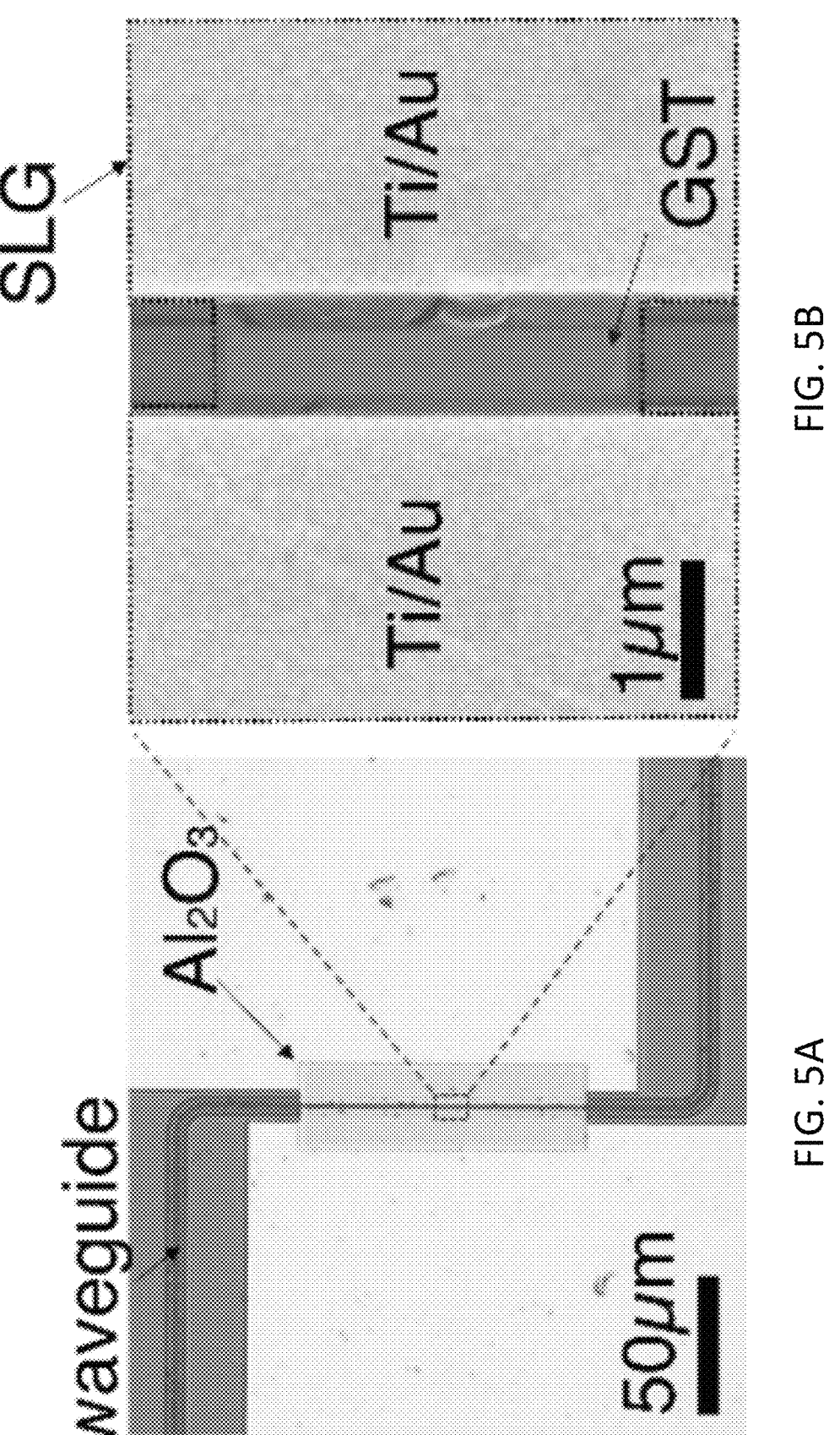
FIG. 5A depicts an optical micrograph of a microring resonator integrated with an example of a phase shifter according to an embodiment of the present invention.
FIG. 5B depicts an SEM of the microring area delineated by the square where the $Sb_2Se_3$ is patterned.

A broadband amplitude-modulating waveguide switch (a transmission switch) based on the absorption modulation of GST (germanium-antimony-tellurium) was fabricated using the device structure depicted in FIGS. 1A-1C and the fabrication methods discussed above. The fabricated device structure is shown in FIGS. 5A and 5B.

GST undergoes a large change in its complex refractive index upon phase transitions, which gives rise to a remarkable modification of the optical mode of the GST-clad waveguide. GST exhibits a strong optical absorption in the crystalline state in the near infrared portion of the electromagnetic spectrum. Thus, GST may not be an ideal material for phase-only control in the near infrared (NIR). But utilizing GST for transmission switching across a wide wavelength range is attractive for applications such as photonic memory and optical computing, among others.

Figure 6A:
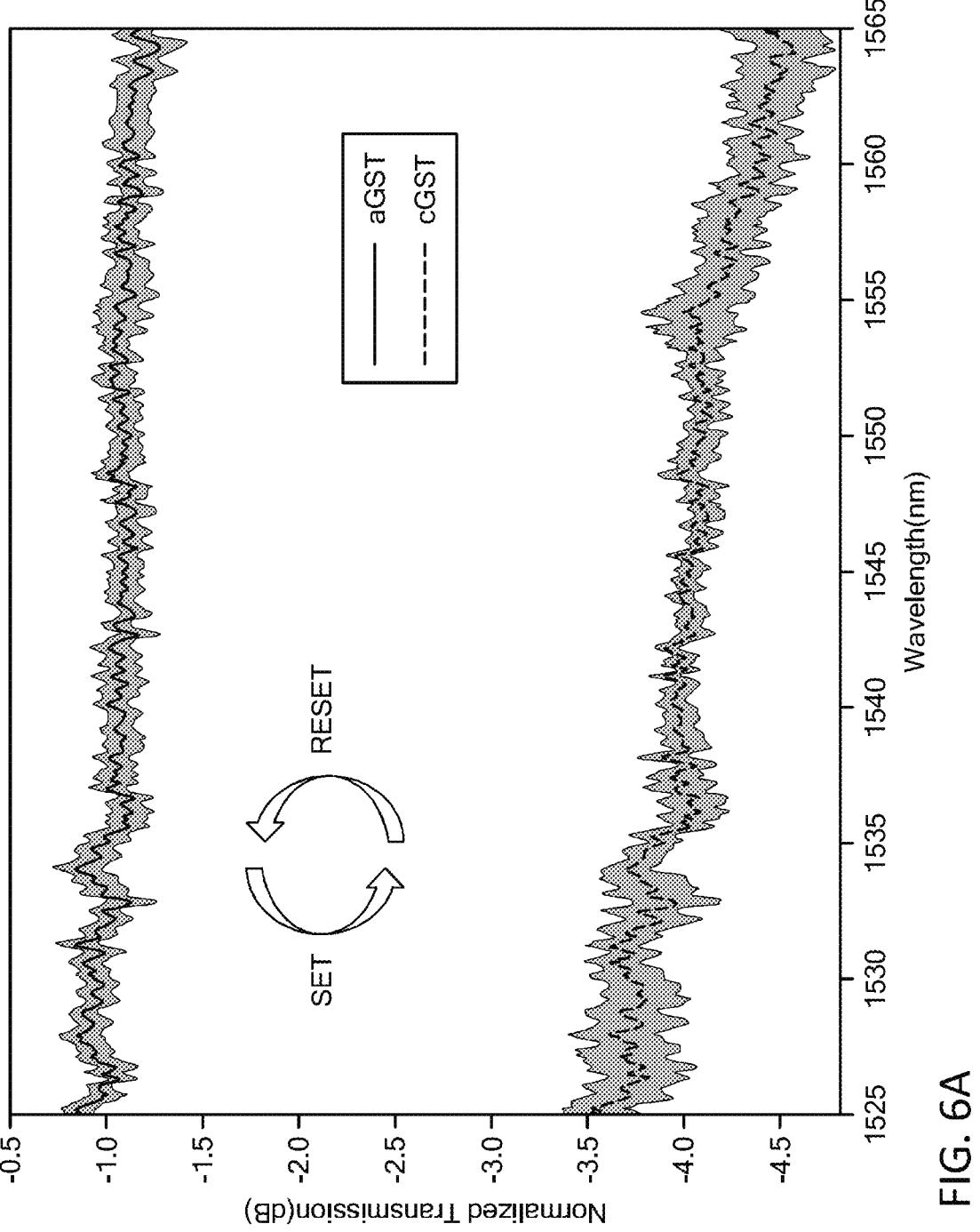
FIG. 6A depicts data indicating reversible switching of a GST using a graphene heater on an SOI waveguide.

FIG. 6A shows data collected using the GST switch indicating the reversible switching of the waveguide spectrum between low (crystalline GST) and high (amorphous GST) transmission states for 8 consecutive cycles. The shaded regions of the spectra indicate the standard deviation between the 8 switching cycles, clearly revealing the excellent cycle-to-cycle reproducibility. A contrast of 3 dB in transmission was observed across the entire telecommunication C-band with 4.73 $\mu$m long, 23 nm thick GST.

Figure 6B:
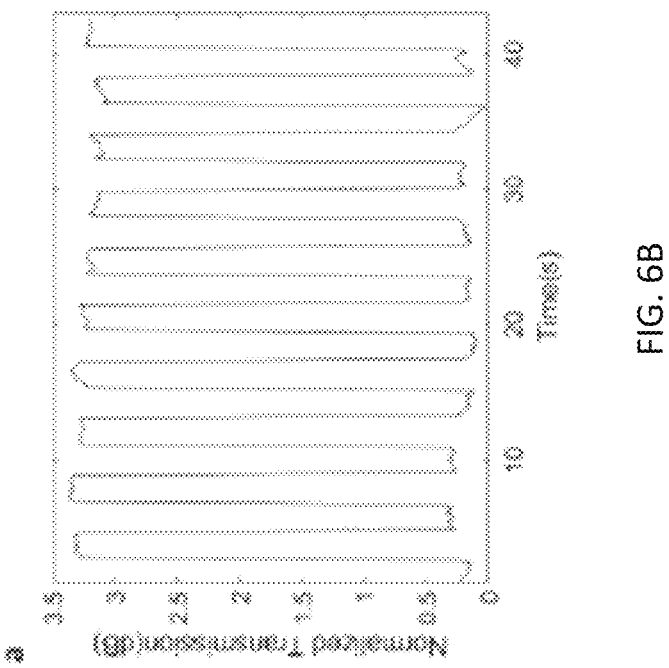
FIG. 6B depicts a temporal trace of transmission changes in transmission of radiation through a waveguide via an SLG-GST photonic switch according to an embodiment of the present invention for ten reversible switching events, where the switching conditions are 3 V, 100 μs pulse width, 120 μs trailing edge for SET pulse and 5 V, 400 ns pulse width, 8 ns trailing edge for RESET pulse.

Temporal trace measurements, shown in FIG. 6B, confirm that the change is indeed nonvolatile and hence caused by the GST. The 0.74 dB/$\mu$m optical contrast is slightly lower than if the GST were deposited directly on top of the waveguides since there is a 20-nm $Al_2O_3$ spacer between the GST and the waveguide but agrees well with the optical mode simulations depicted in FIGS. 7A and 7B, which illustrate simulated fundamental TE mode profiles of the GST-modulated planarized SOI waveguides at a wavelength of 1550 nm. The dashed line (labeled as "SLG") indicates the presence of SLG in the simulation and the line labeled as "Boundary" indicates the boundary between the device layer (220-nm Si) and the buried oxide layer.

Figures 8A, 8B:
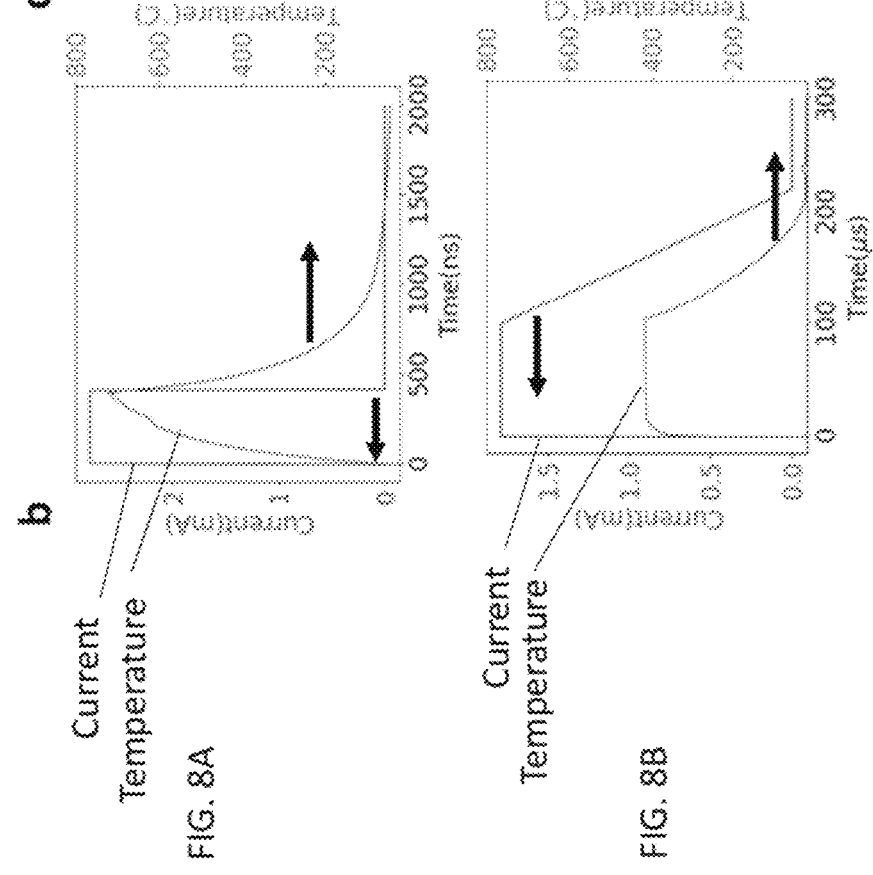
FIG. 8A shows simulated temperature variation with time under the indicated measured current applied to a stack of SLG-GST to cause its amorphization.
FIG. 8B shows simulated temperature variation with time under the indicated measured current applied to a stack of SLG-GST to cause its crystallization subsequent to amorphization.

FIGS. 8A and 8B show the measured currents for amorphization and recrystallization of the GST layer, respectively. The curves labeled as "Current" indicate the current injected into the GST layer and the curves labeled as "Temperature" indicate the temperature of the GST layer corresponding to amorphization and crystallization.

Figures 9A, 9B:
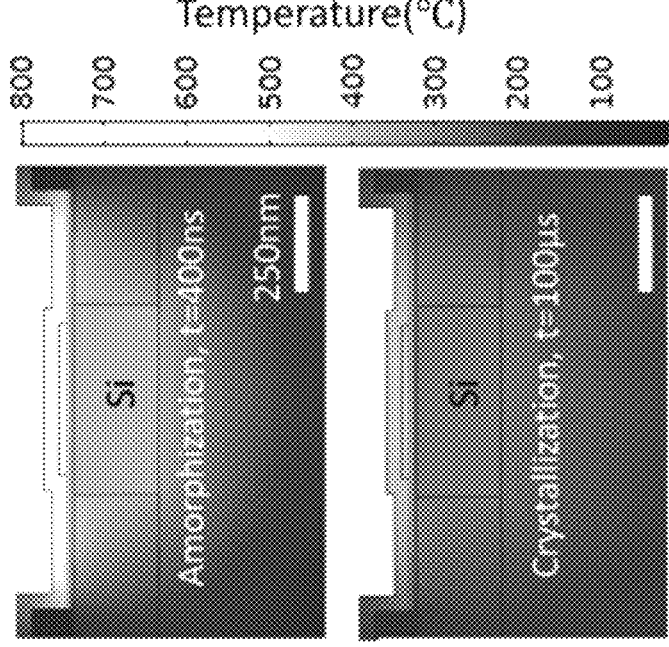
FIG. 9A shows simulated temperature distribution at 400 ns under an injecting current of 2.78 mA in a stack of SLG-GST photonic switch according to an embodiment of the present invention.
FIG. 9B shows simulated temperature distribution at 100 μs under an injecting current at 1.89 mA in a stack of SLG-GST photonic switch according to an embodiment of the present invention.

FIG. 9A illustrates a simulated temperature distribution of various layers of the switch in response to injection of a 2.78 mA current into the graphene layer, which leads to the amorphization of the GST. And FIG. 9B shows a simulated temperature distribution in various layers of the switch in response to injection of a 1.80 mA current into the graphene layer with the GST layer in a crystalline state.

Heat transfer simulations shown in FIGS. 8A and 8B also confirm that the temperature had reached the required threshold temperatures for both crystallization and amorphization of GST. The total switching energy for amorphization was 5.55 nJ, corresponding to an energy density of 127.6 nJ/nm³ and the energy dissipated by the graphene heater alone (i.e., excluding the power loss at the contact resistance) was only 0.380±0.062 nJ, equivalent to an energy density of 8.74±1.42 nJ/nm³.

Figure 10:
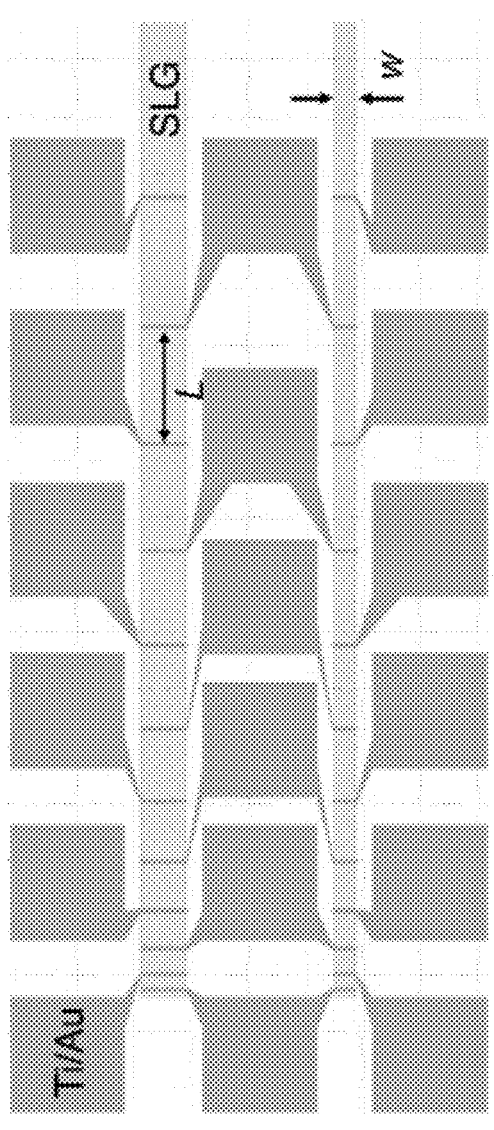
FIG. 10 is a schematic depiction of a device for characterizing sheet resistance of an SLG sheet, where W represents the SLG width and L represents the SLG length.

The sheet resistance of the SLG was extracted by an array of test devices next to the photonic switches with different lengths and widths of SLG connecting to the metal contacts, as shown schematically in FIG. 10.

Figure 11:
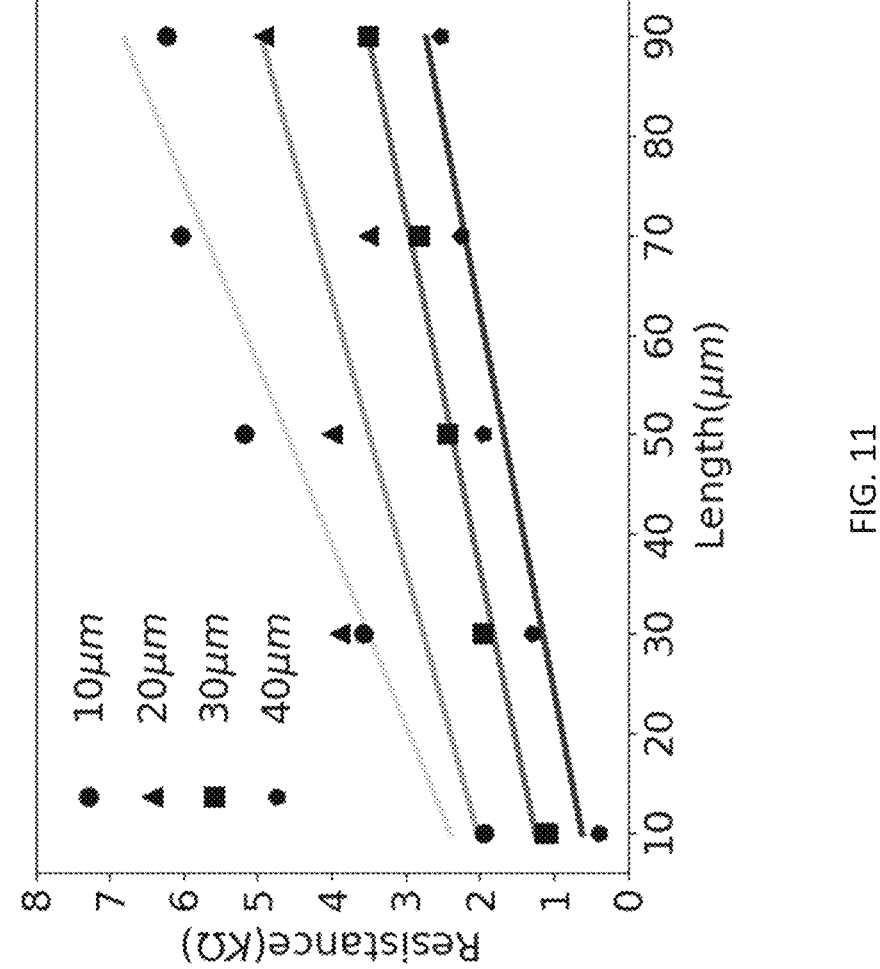
FIG. 11 illustrates measured sheet resistance of SLG sheets of different widths as a function of length, where the resistance was measured at a DC applied bias voltage of 0.1 mV.

The resistance was measured at 0.1 mV DC bias voltage and was plotted against the SLG length, as shown in FIG. 11.

The sheet resistance was extracted by fitting the experimental data to the following relation:

$$R_{total} = 2R_{contact} + R_{sheet}\frac{L}{W} \qquad \text{Eq. (1)}$$

Figure 12:
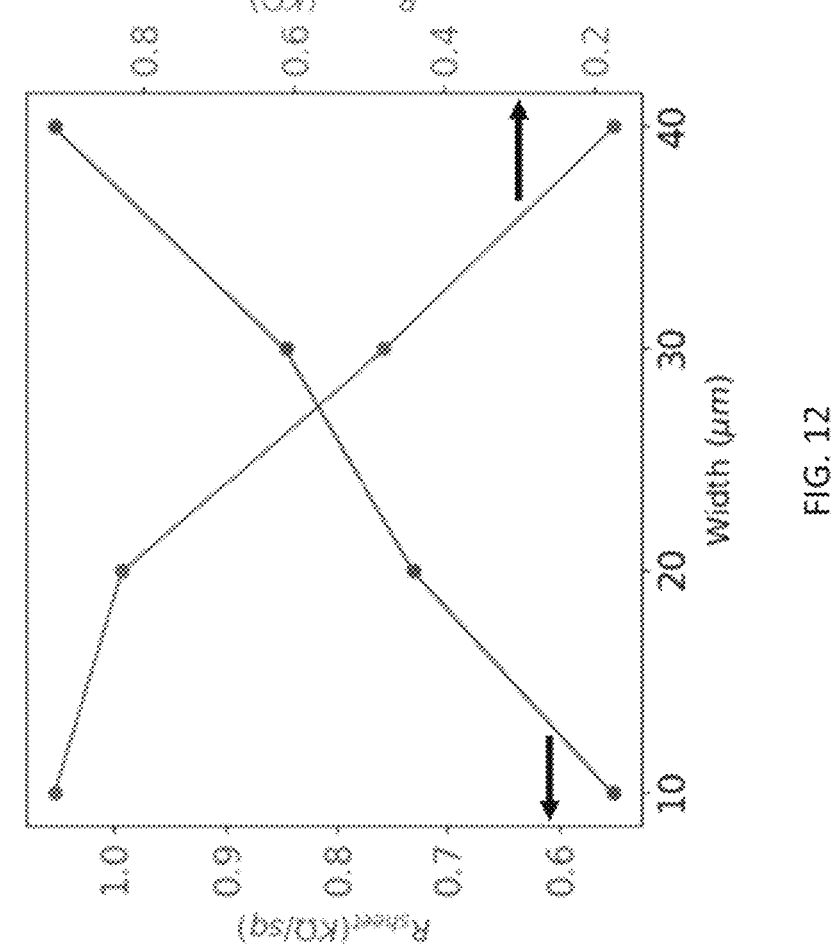
FIG. 12 illustrates the extracted sheet resistance and contact resistance of an SLG sheet as a function of its width.

The lowest sheet resistance was measured as $R_{sheet}$=551±91 $\Omega$/sq at 10 $\mu$m width of the SLG and at a contact resistance of $R_{contact}$=919±261$\Omega$, as shown in FIG. 12. Ideally, the SLG sheet resistance should not depend on the width of the SLG, but it was found that the SLG sheet resistance and the SLG width were positively correlated. Without being limited to any particular theory, such a correlation can be due to the grater susceptibility of the SLG to defects, such as pores and wrinkles, as the SLG area increases.

To obtain a low $R_{sheet}$, in various embodiments, the area of the SLG can be reduced between the electrodes. In various embodiments, to further reduce the SLG sheet resistance, hBN encapsulated SLG can be transferred mechanically, enabling high mobility charge transport. On the other hand, FIG. 12 also shows that a large contact width between the SLG and metal contacts can reduce the $R_{contact}$.

In some embodiments, 1D edge contacts can be made to obtain ultra-low contact resistance and hence reduce the power loss at the contacts. In this example, the total resistance of 1961±542$\Omega$ is consistent with a total resistance of about 2000$\Omega$ that was measured for the fabricated SLG-PCM photonic switches.

Figure 13:
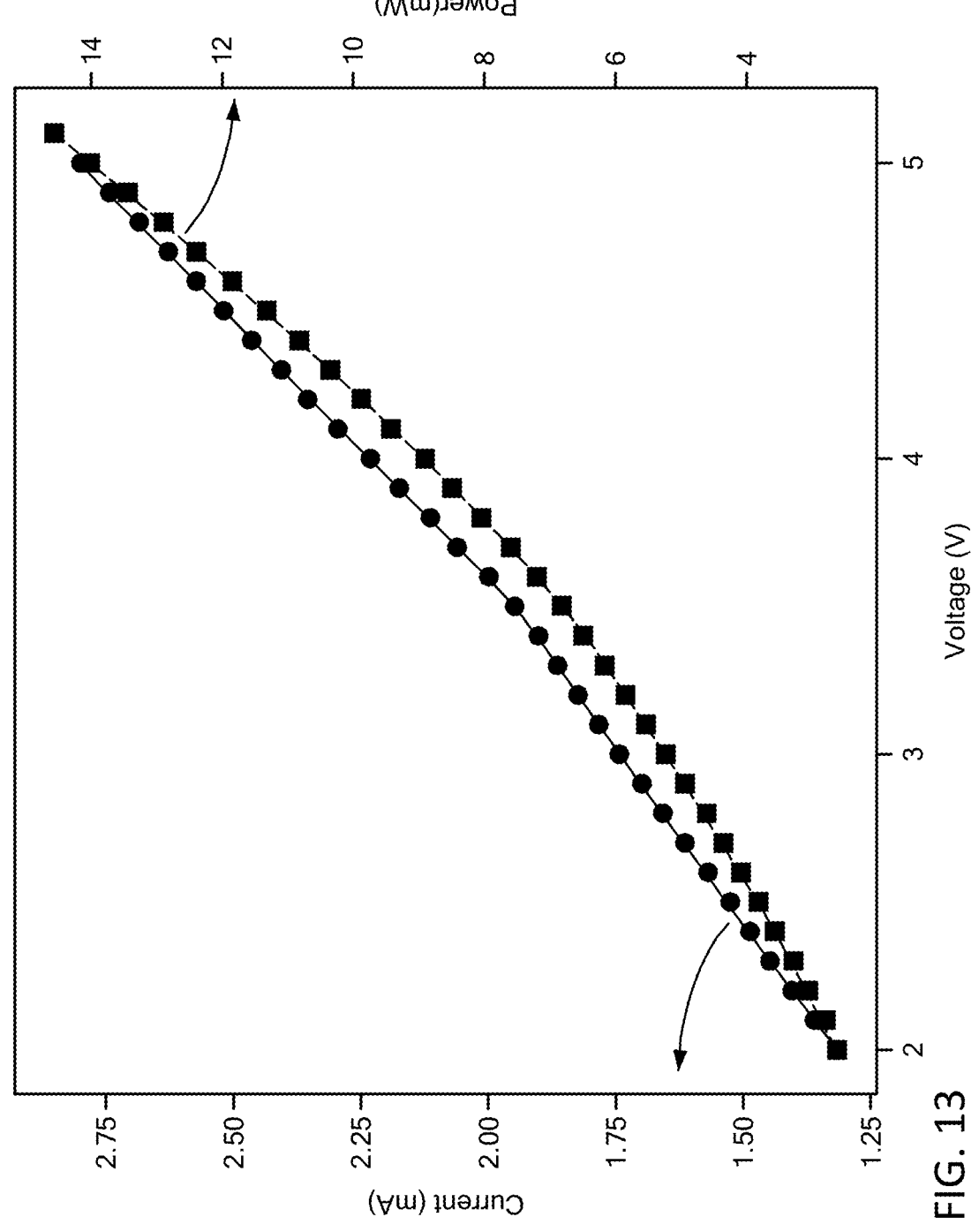
FIG. 13 is a measured I-V curve of an SLG-GST device according to an embodiment of the present invention for an applied voltage in a range of 2 V to 5.2 V.

To extract the programming energy per bit, the I-V curve of the devices was measured to determine the power consumption. FIG. 13 shows the I-V curve from 2V to 5.2V of a ~5 $\mu$m wide SLG heater that was used to switch the GST on SOI. The power was calculated to be 13.9 mW (amorphization) and 5.37 mW (crystallization), which results in the total energy per bit of 5.55 nJ (400-ns pulse width, amorphization) and 860.71 nJ (100-$\mu$s pulse width, 120-$\mu$s trailing edge, crystallization). Although crystallization occurs at a lower power than amorphization, it consumes higher energy as the pulse width and trailing edge are longer. The programming energy density can then be estimated by dividing the energy by the PCM volume.

The GST volume was calculated to be 23 nm×4730 nm×400 nm, where the area was measured by SEM and thickness was measured by ellipsometer. This yielded an energy density of ~127.6 fJ/nm³ (amorphization) and ~19.78 fJ/nm³ (crystallization). However, in this illustrative example, a significant amount of power was lost in the contact resistance and hence did not contribute to PCM heating. The $R_{sheet}$ extracted above was used to estimate the energy consumed solely in the heater region. The power consumed by the SLG heater region can be expressed as:

$$P_{SLG} = I^2 R_{sheet}L/W \qquad \text{Eq. (2)}$$

where I represents the measured current derived from the I-V curve (2.78 mA at 5V for GST), L represents the heater length, which was measured to be 1.1 $\mu$m, and W is the heater width which was measured to be 4.93 $\mu$m. The programming energy consumed by the SLG heater alone was therefore 0.380±0.062 nJ (amorphization) and 63.3±10.3 nJ (crystallization). The programming energy density was 8.74±1.42 nJ/nm³ (amorphization) and 1.45±0.24 fJ/nm³ (crystallization). This represents a 20-fold reduction compared to other devices using an SLG heater (See, e.g., Rios, C. et al. Multi-level electro-thermal switching of optical phase-change materials using graphene. Adv. Photonics Res. 2, 2000034 (2021)), where the contact resistance was also subtracted, and 70-fold reduction compared to the most energy-efficient doped Si heaters.

Figures 14A, 14B:
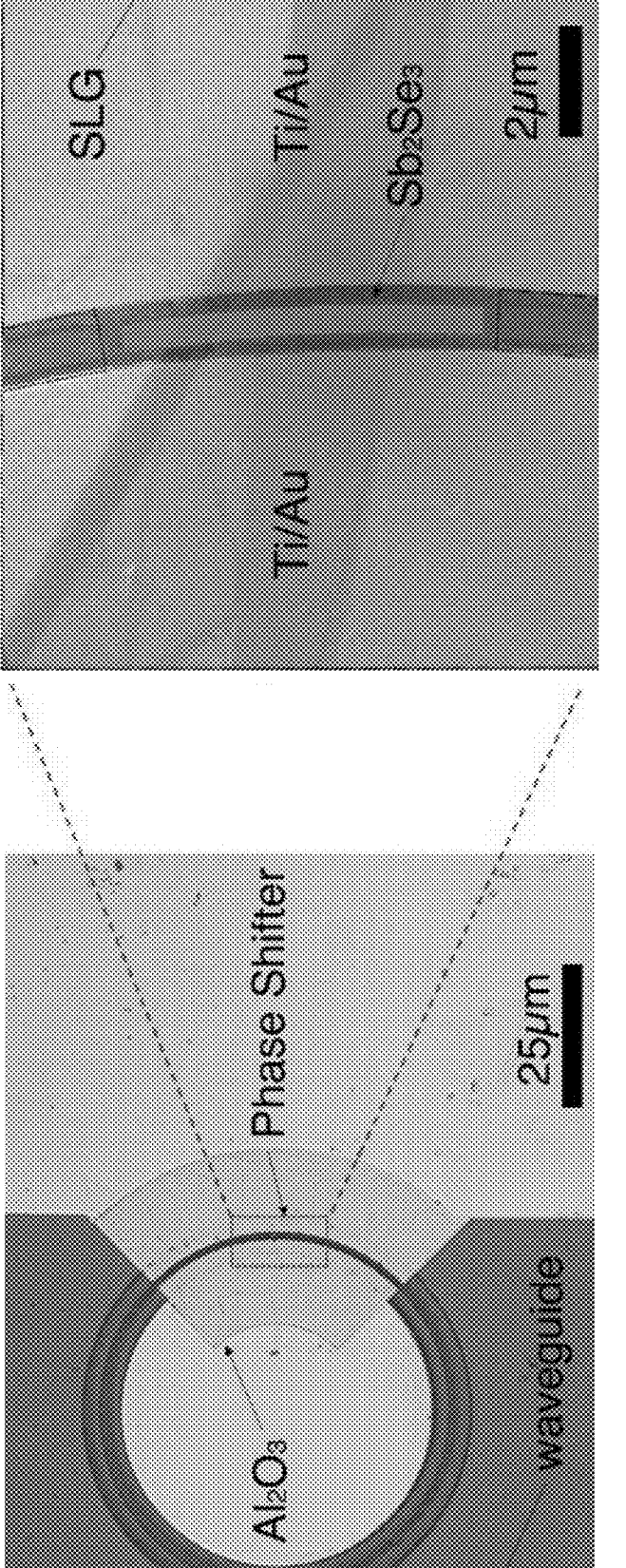
FIG. 14A is an optical micrograph of a microring resonator integrated with a phase shifter according to an embodiment of the present invention which employed a 20-nm $Sb_2Se_3$ as the PCM.
FIG. 14B is an SEM of the microring area depicted by the square where the $Sb_2Se_3$ is patterned.

Graphene-Assisted Low-Loss Phase Shifter Based on $Sb_2Se_3$ in a Microring Resonator A low-loss PCM $Sb_2Se_3$ was utilized to fabricate a graphene-assisted non-volatile phase shifter in a microring resonator configuration. FIG. 14A shows an optical micrograph of the fabricated device and FIG. 14B shows a SEM of a 6 μm long, 400 nm long, 400 nm wide, and 30 nm thick $Sb_2Se_3$ patch on the microring resonator waveguide, which is identified by the dashed rectangle in FIG. 14A.

Figure 15A:
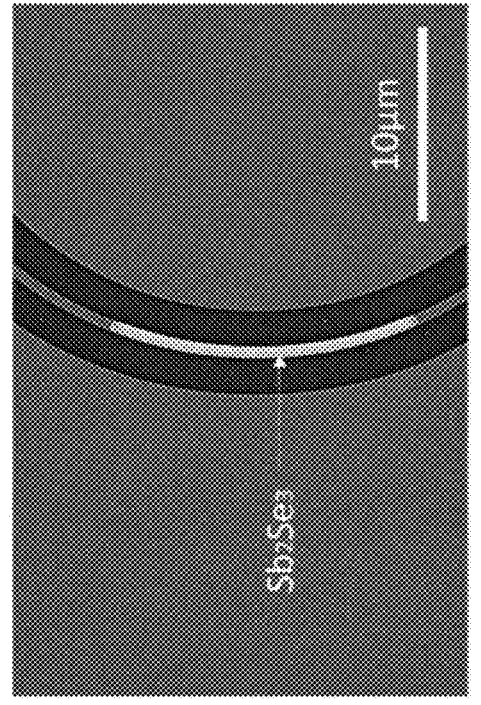
FIG. 15A is an SEM showing that the $Sb_2Se_3$ material employed as the PCM in the phase shifter illustrated in FIG. 14A was patterned on top of the silicon microring resonator.
Figure 15B:
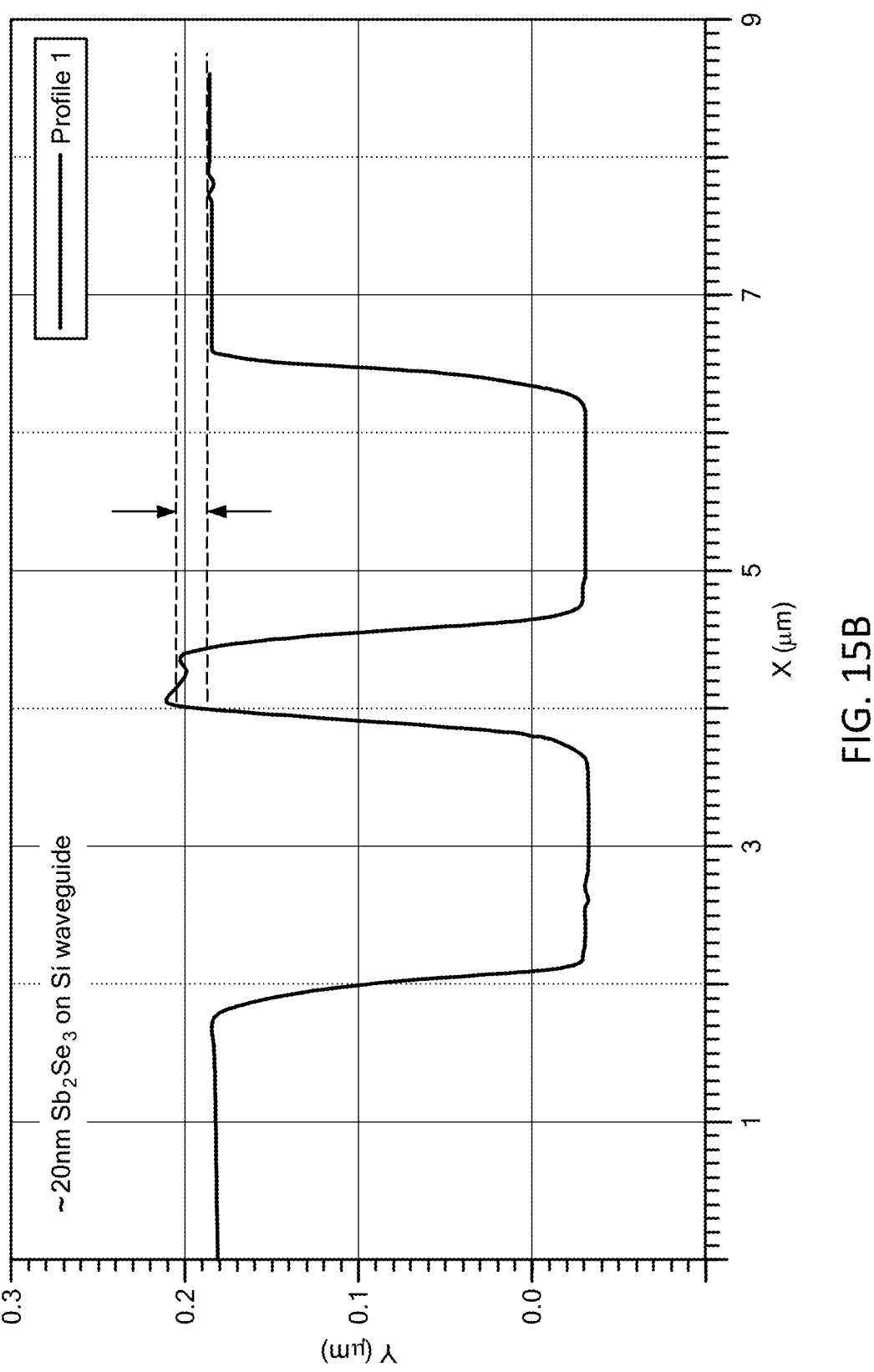
FIG. 15B is an AFM measured cross-section of the microring resonator waveguide of the phase shifter depicted in FIG. 14A with the $Sb_2Se_3$ layer on the top of the waveguide.

The transparent window of $Sb_2Se_3$ is in the NIR, where a negligible insertion loss of 0.002±0.002 dB/μm of the $Sb_2Se_3$-loaded waveguide at 1550 nm was extracted using a cutback method as discussed in more detail below with reference to FIGS. 15A-15C.

Figure 16:
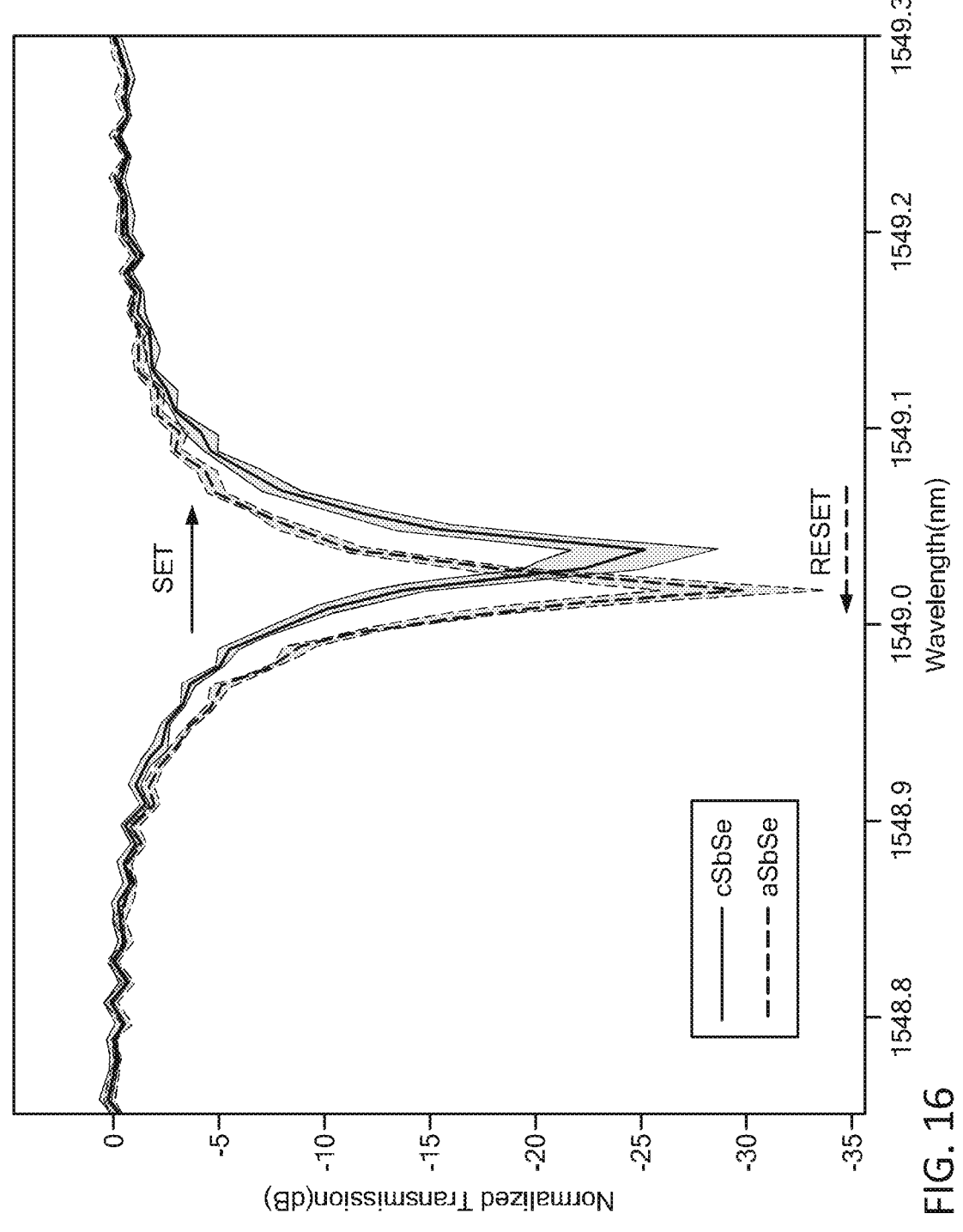
FIG. 16 illustrates reversible switching of the $Sb_2Se_3$ layer using a graphene heater incorporated in the phase shifter illustrated in FIG. 14A, FIGS. 17A and 17B show simulated fundamental TE mode profile of a phase shifter according to an embodiment of the present invention, which included a 30-nm $Sb_2Se_3$ layer as the PCM deposited on an underlying planarized SOI waveguide.

By way of illustration, a reversible tunning of a microring resonance at 1549 nm is shown in FIG. 16, where the spectra of three cycles are plotted and the gray regions indicate standard deviations between the cycles.

The total switching energy for amorphization was 9.25 nJ (128.4 nJ/nm³) and the energy dissipated by the graphene heater alone (i.e., excluding the power loss at the contact resistance) was only 0.57±0.09 nJ and 7.9±1.3 nJ/nm³.

Figure 17A:
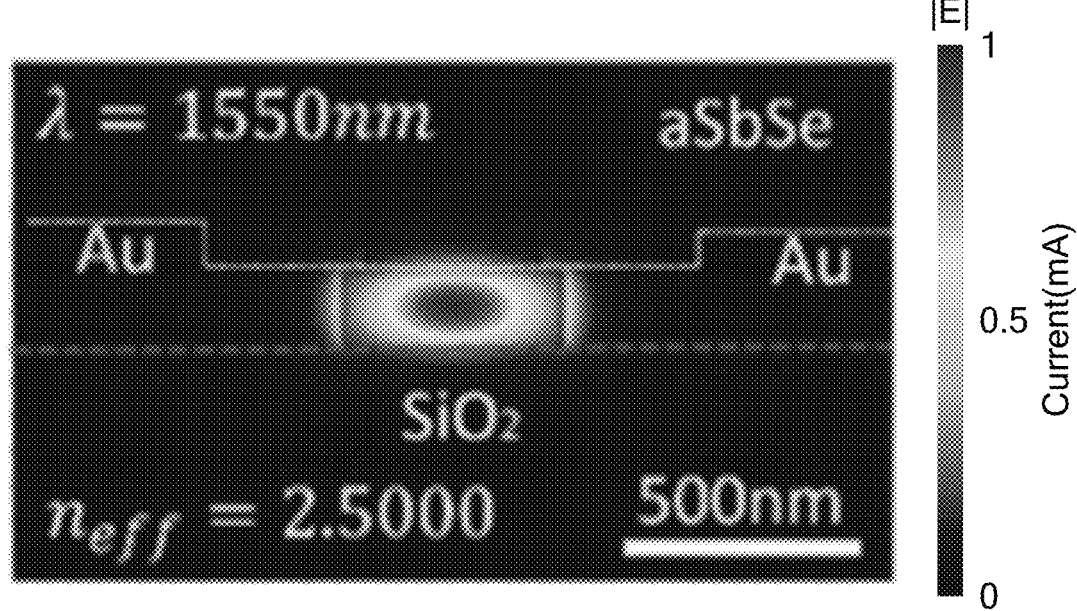
Figure 17B:
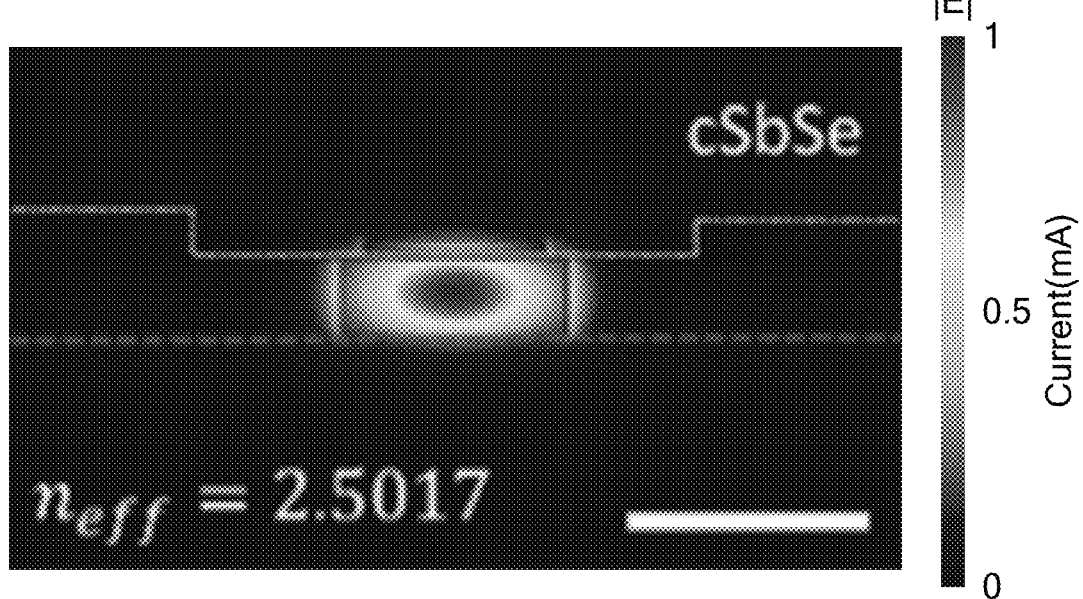

A maximum resonance shift of 0.021 nm was extracted, which corresponds to a phase shift of 0.00822 π and V·L of 0.496V-cm (assuming a switching voltage of 6.8 V), representing a three-fold improvement compared to the state-of-the-art silicon PN phase shifter. The phase shift matches the simulation shown in FIGS. 17A and 17B.

It is expected that the phase modulation can be further improved with a higher quality $Sb_2Se_3$ and a thinner spacer. The increase in insertion loss (IL) of $Sb_2Se_3$ in crystalline state can be extracted by fitting the Q factor of the resonances, which is estimated to be 0.006±0.002 dB/μm.

The insertion loss associated with metal and graphene was estimated to be 0.002±0.001 dB/μm and 0.047±0.006 dB/μm, respectively, from fitting the microrings spectra after each overlay step. The total IL was only ~0.33 dB for a device of 6 μm in length. The graphene IL was slightly lower than the loss measured in a similar graphene-on-microrings structure disclosed in "High-responsivity graphene photodetectors integrated on silicon microring resonators," by Schuler, S. et al. and published in Nat Commun 12, 3733 (2021), where an IL of ~0.07 dB/μm was extracted.

Without being limited to any particular theory, the reduction in the graphene IL in this example is likely attributable to a lower carrier density and the 10 nm ALD $Al_2O_3$ spacer between the graphene and the waveguides, compared to 3 nm hBN used in the Schuler et al.'s device. Optical losses in graphene can be further suppressed via electrical gating to the Pauli blocking region, e.g., in a manner described in "Gate-variable optical transitions in graphene" by Wang, F. et al., published in *Science* 320, 206-209 (2008) and "Graphene-silicon phase modulators with gigahertz bandwidth," by Sorianello, V. et al., published in Nature Photon 12, 40-44 (2018).

Figure 18:
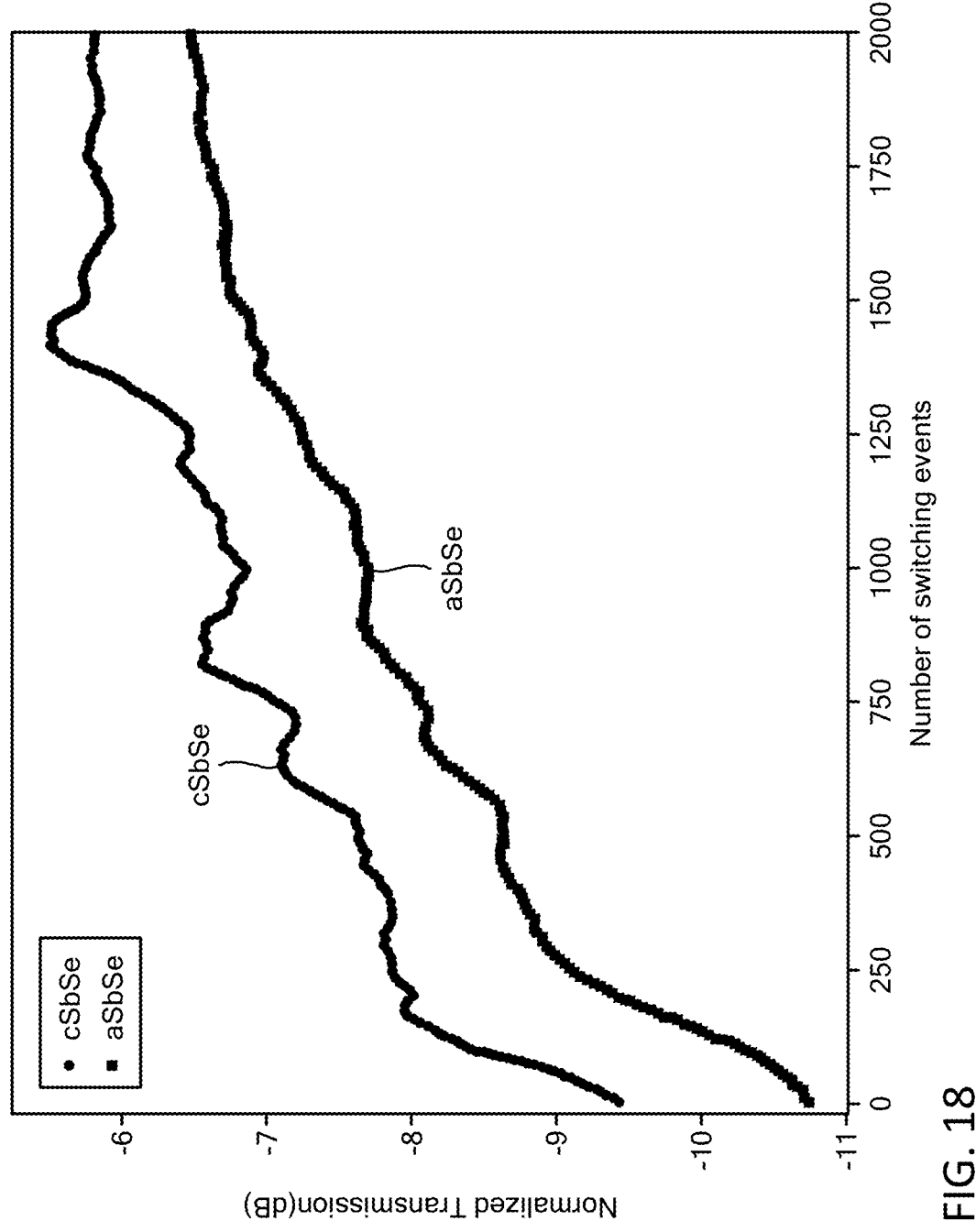
FIG. 18 shows the recyclability of the phase shifter switch depicted in FIG. 14A for 2000 switching events.

The excellent endurance of the phase shifter was demonstrated by performing 2,000 switching events on the phase shifter, as shown in FIG. 18. The laser wavelength was slightly detuned from the resonance wavelength to mitigate the transmission fluctuations from the thermal drift.

Figures 19A, 19B:
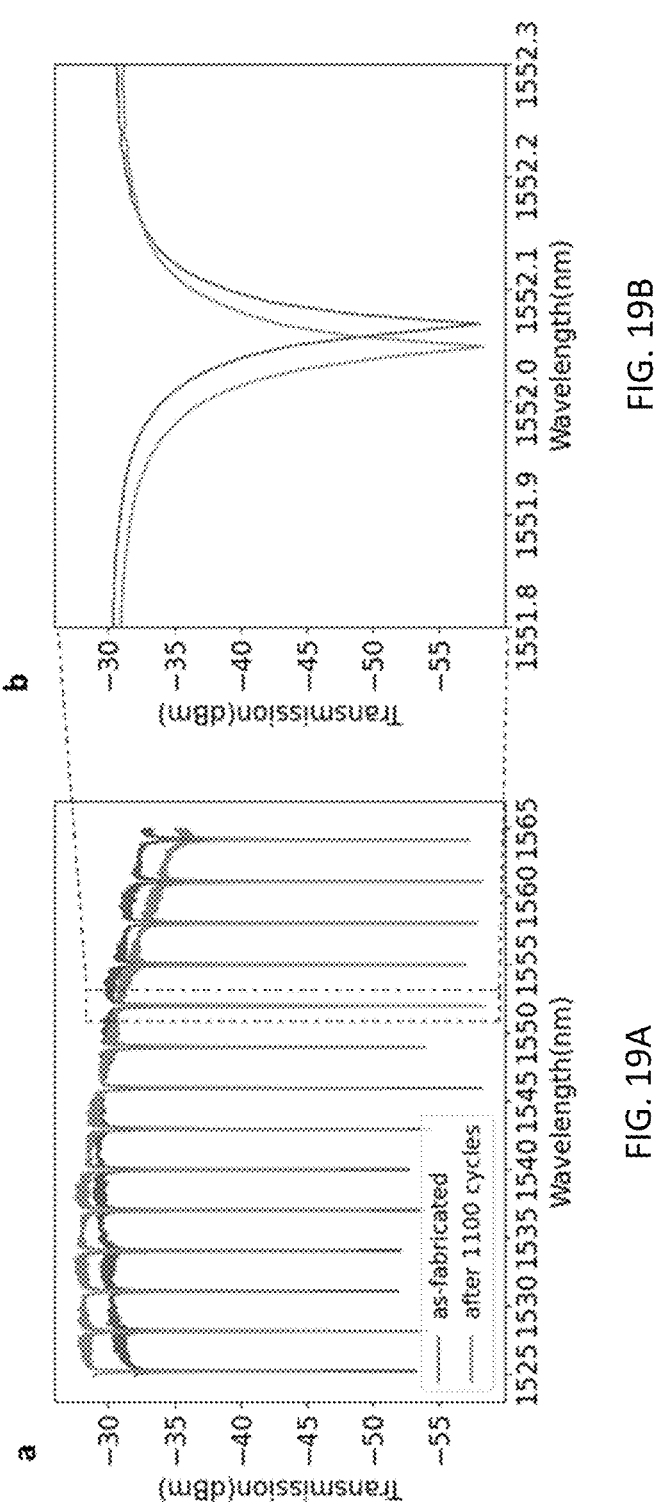
FIG. 19A shows transmission spectrum of an as-fabricated microring phase shifter according to an embodiment of the present invention and the spectrum after 1,100 reversible switching cycles.
FIG. 19B shows a zoom-in depiction of the resonance at 1552 nm in the spectrum illustrated in FIG. 19A.

Again, without being limited to any particular theory, the gradual increase in transmission with cycling time shown in FIG. 18 is believed to be caused by the temperature-induced drift of resonance wavelength away from the initial laser wavelength. A comparison of the spectrum of the as-fabricated microring and the one measured after 1,100 continuous cycles, as illustrated in FIGS. 19A and 19B, shows that no broadening of the resonance peak was observed, implying that the cycling does not induce any damage to the phase shifter.

Figure 20:
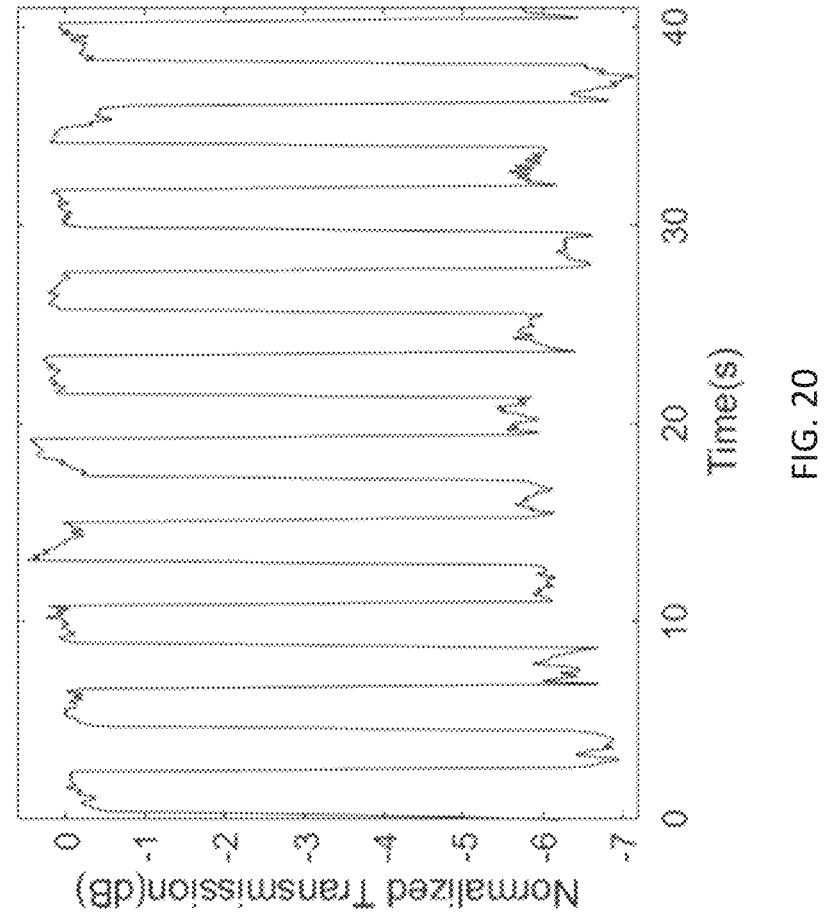
FIG. 20 shows a temporal trace of the $SLG-Sb_2Se_3$ phase shifter for ten reversible switching events.

The temporal trace after 1,100 cycles still showed a large optical contrast of 7 dB, as illustrated in FIG. 20 as the laser wavelength was parked near the resonance. Transmission measurements taken between the switching events (duration of 2s) indicate the change is nonvolatile and is indeed caused by $Sb_2Se_3$.

Figures 21A, 21B:
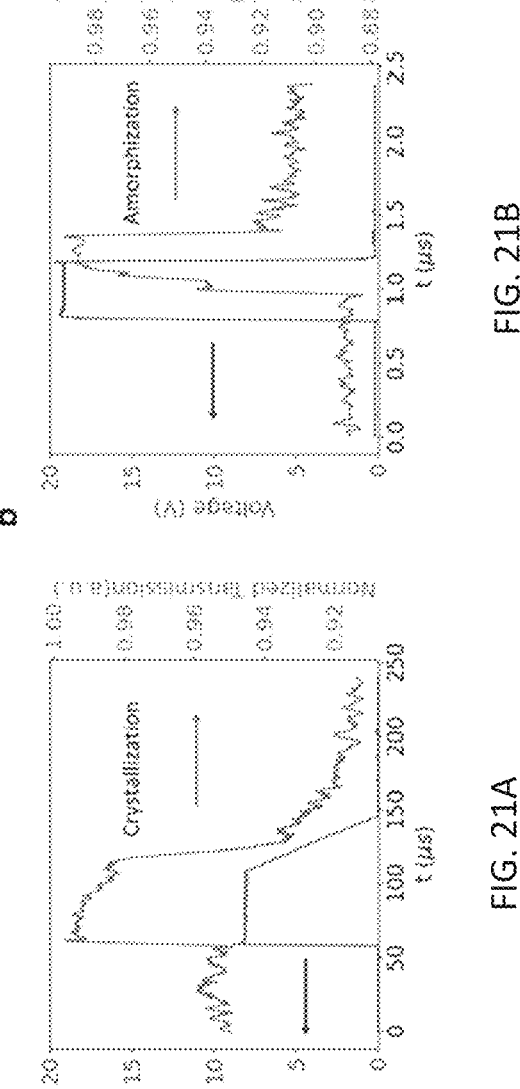
FIG. 21A shows an example of a crystallization voltage pulse as well as the corresponding change in the normalized transmission of the waveguide.
FIG. 21B shows an example of the temporal profile of an amorphization voltage pulse as a function of time as well as the corresponding change in the normalized transmission of the waveguide.

The transient response of the switching is characterized by a 150 MHz fast photoreceiver, as illustrated in FIGS. 21A and 21B.

For crystallization, a 50-μs wide pulse with a 30-μs trailing edge was applied to the heater at an amplitude of 8 V. For amorphization, a 400-ns wide pulse with a 8-ns trailing edge was applied to the heater at an amplitude of 19 V. The choice of the relatively high voltage was based on the high resistance (about 9 KΩ) of the device. The small optical contrast is due to a small increase in optical absorption in $Sb_2Se_3$ (about 0.06 dB/μm). The data shows that the thermal relaxation for the crystallization pulse is longer (about 50 μs) due to its long trailing edge, which is required for crystallization. In contrast, a much faster response (about 500 ns) was observed for amorphization due to the short trailing edge (about 8 ns) of the amorphization pulse.

Without being limited to any particular theory, the low thermal mass of the ultra-thin graphene layer enables fast heat dissipation and hence short thermal relaxation, limited only by the falling edge of the excitation voltage pulse. While it is difficult to decouple the contribution of the material phase change from relaxation time to the switching time, it is believed that the switching time is primarily limited by the thermal relaxation, rather than phase transition, because the change in dielectric constant caused by phase transition typically occurs at a picosecond time scale while heat diffusion typically requires hundreds of nanoseconds.

Quasi-Continuous Multilevel Phase Modulation Using the Graphene-$Sb_2Se_3$ Phase Shifter and Graphene-GST Waveguide In was also demonstrated that in addition to bistable switching, the above phase shifter can be tuned quasi-continuously to attain multiple optical phase levels by controlling the programming energy.

Figure 22A:
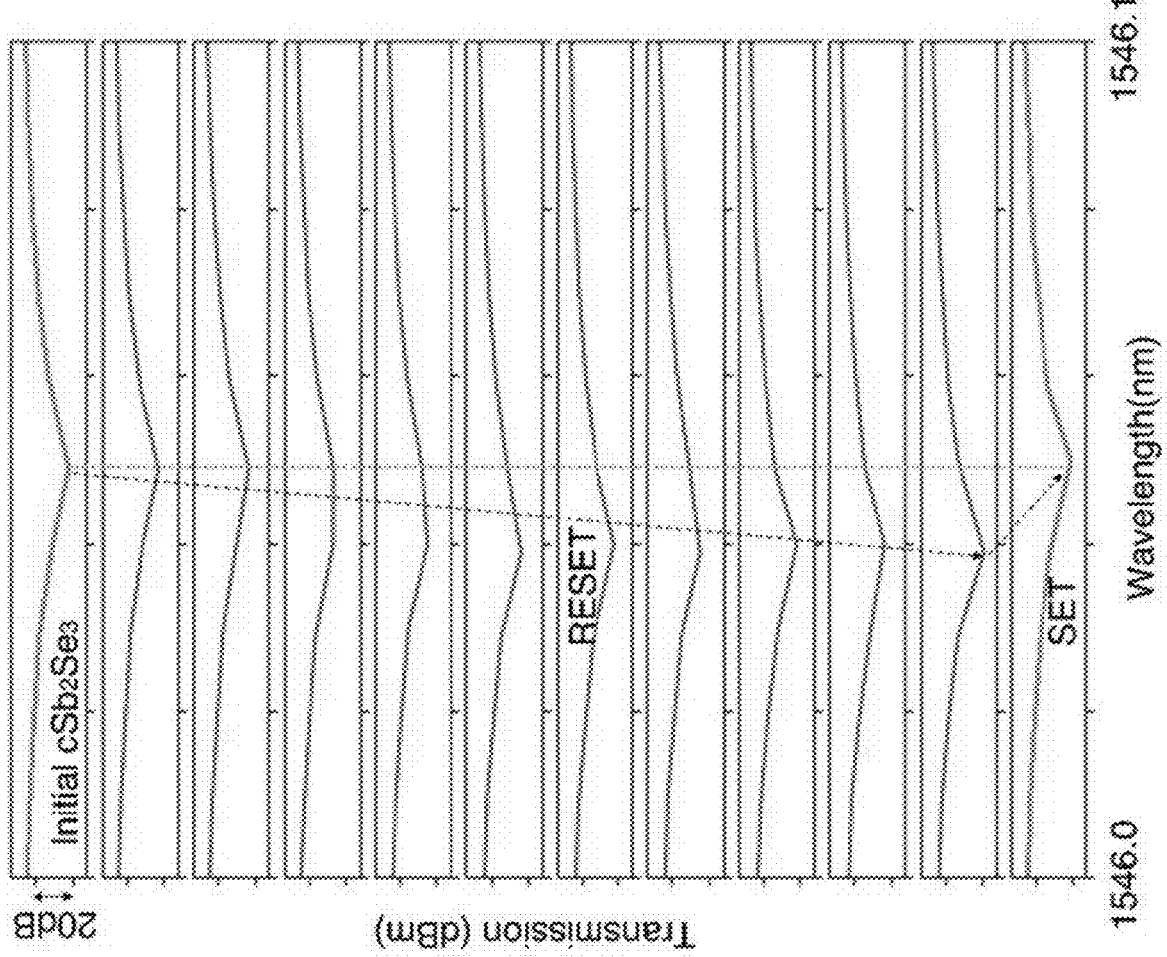
FIG. 22A shows a quasi-continuous tuning of a microring resonance of a phase shifter according to an embodiment via step amorphization.

By way of example, FIG. 22A shows that as the programming voltage was monotonically increased at a step size of 0.1 V from 5.5 V to 6.4 V (pulse width and trailing edge were fixed at 400 ns and 8 ns respectively), an increasingly higher temperature was attained in the heater and increasingly larger volume of the PCM became amorphized.

As a result, the resonance dip shifts gradually to the shorter wavelength and these intermediate states correspond to partially amorphous PCMs. After 10 pulses of increasing amplitude, a SET pulse of 4V (100 μs pulse width and 120 μs trailing edge) was used to return the resonance to the original position. The resonance wavelength of the material state achieved after the application of the SET pulse matched the resonance wavelength of the initial crystalline state, as indicated by the grey dashed line in FIG. 22A.

Figure 22B:
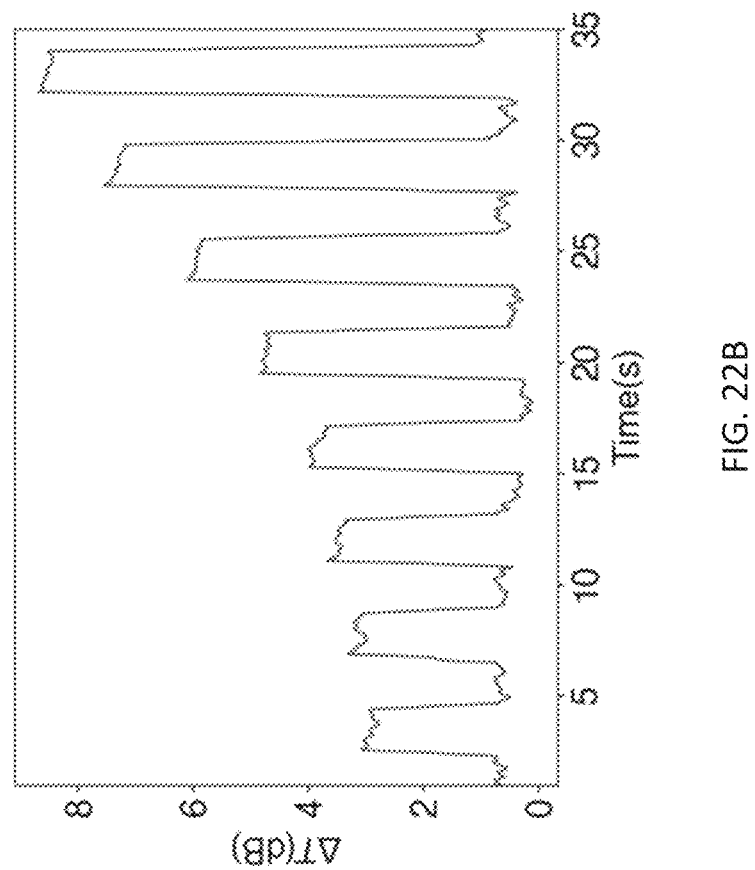
FIG. 22B shows temporal trace of a continuous programming iteration with a monotonically increasing RESET pulse amplitude from 5.5 V to 6.9 V followed by a SET pulse applied to a microring resonator having a phase shifter according to an embodiment of the present invention.
Figure 22C:
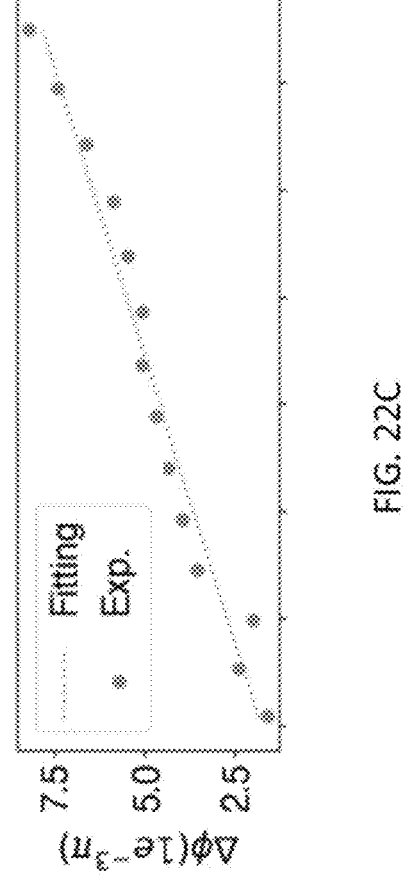
FIG. 22C shows a change in the phase shift of a microring resonator having a phase shifter according to an embodiment as a function of the programming energy.
Figure 22D:
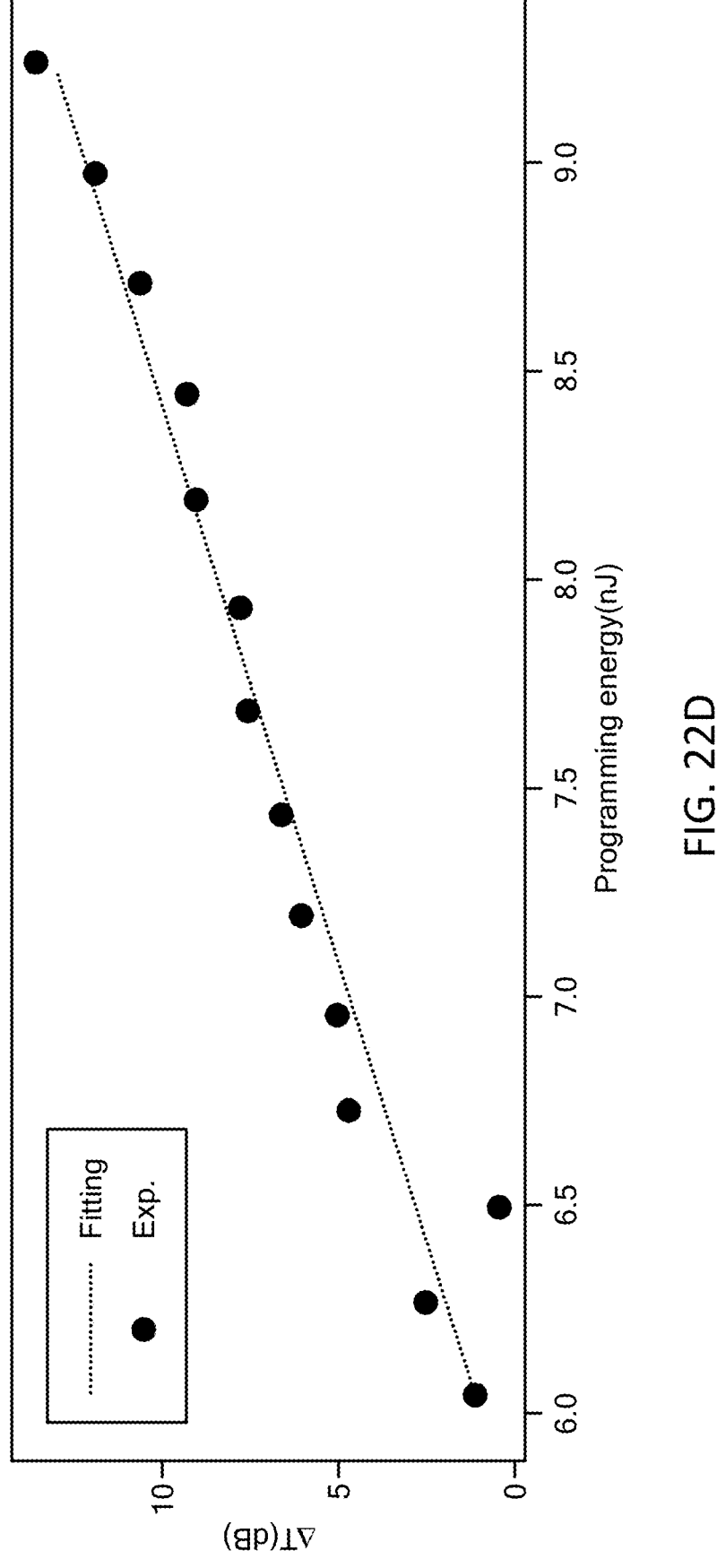
FIG. 22D shows a change in transmission of an electromagnetic wave through a microring resonator having a phase shifter according to an embodiment of the present invention caused by phase shift with respect to a programming energy.

The time dynamic response was investigated by increasing the programming voltage by 0.2 V increments from 5.5 V to 6.9 V and the transmission was continuously monitored with respect to time, as shown in FIG. 22B. After each RESET operation, the PCM was returned to the initial crystalline state by the same SET pulse of 4V. Eight distinct transmission levels can be clearly resolved with ~1 dB contrast between adjacent levels. To better quantify the multi-level phase modulation, the phase shift was extracted from the change in the resonance wavelength corresponding to each RESET pulse and the phase shift was plotted against the programming energy, as illustrated in FIG. 22C. Fourteen phase levels were attained by increasing the programming energy from 6 nJ to 9.5 nJ, where the phase increased linearly with the programming energy. FIG. 22D shows that the resulting change in transmission from the phase modulation matches with FIG. 22C.

Figure 23A:
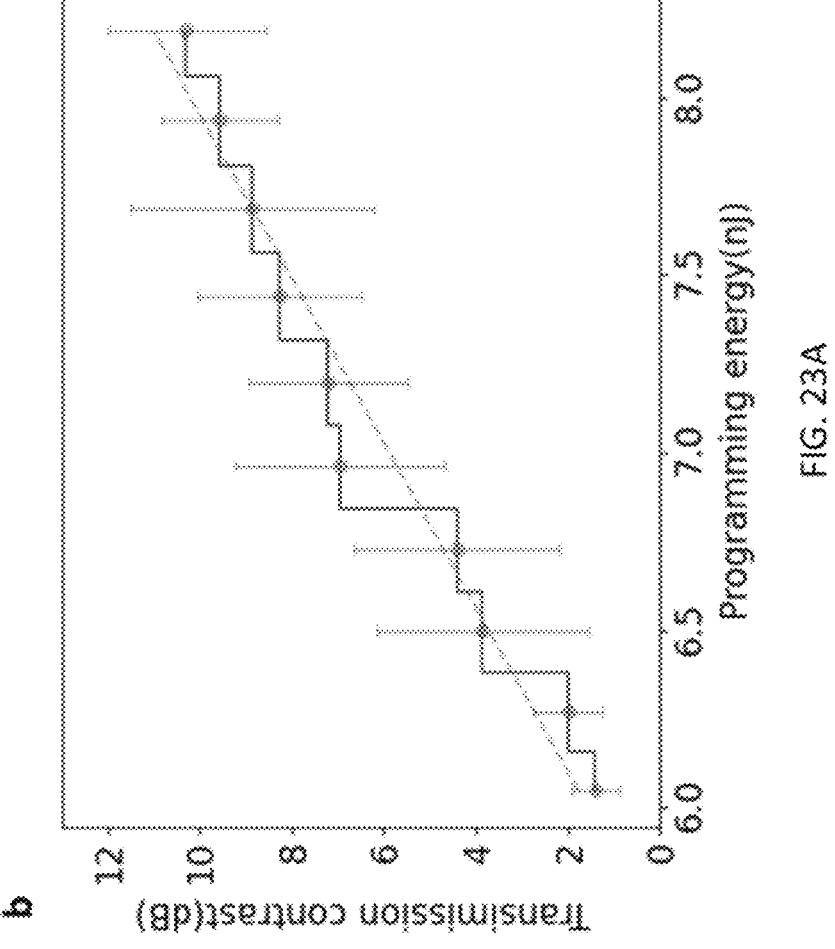
FIG. 23A shows an example of reproducibility of a multi-level operation of a waveguide having an PCM-based transmission switch according to an embodiment, which was evaluated via five iterations of SET and RESET pulse cycles.

As illustrated in FIG. 23A, the reproducibility of the multi-level operation was evaluated for five iterations, showing that although the transmission levels are not entirely deterministic, the mean transmission increases with the programming energy almost linearly.

Figure 23B:
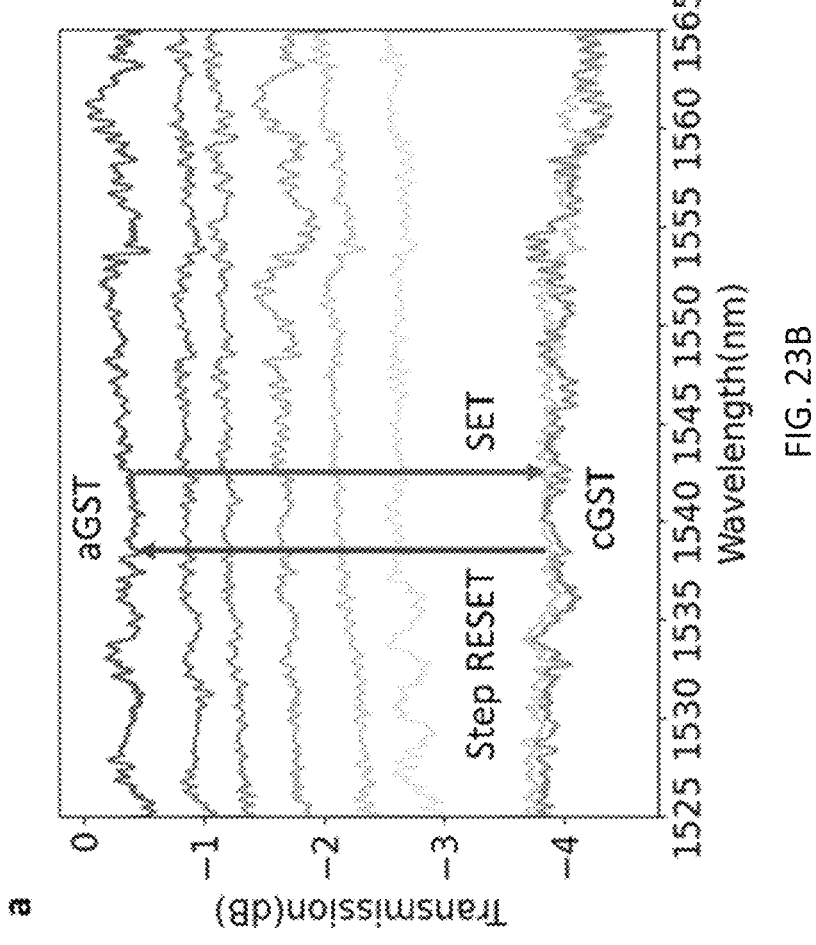
FIG. 23B shows a multi-level operation of an SLG-GST waveguide switch providing a transmission switch via step amorphization, FIG. 24 provides a plot of the number of switching cycles demonstrated against the programming energy density per bit of recent reports regarding electrical tuning of PCMs in photonics devices, and FIG. 25 a Raman spectrum measured corresponding to the graphene region on fabricated prototype devices according to various embodiments of the present invention.

Similarly, as illustrated in FIG. 23B, a multilevel operation of the graphene-GST waveguide was also realized, where seven distinct transmission levels were obtained.

Further, in some embodiments, multilevel operation of a phase shifter according to the present invention may be implemented via step crystallization by adjusting the pulse amplitude and width of the applied voltage.

Comparison to Other Nonvolatile Electrically Reconfigurable Photonic Platforms

By way of illustration, the performance of examples of graphene-PCM hybrid platforms according to the present invention discussed above was compared to other electrical switching approaches in PCM-based photonics.

Figure 24:
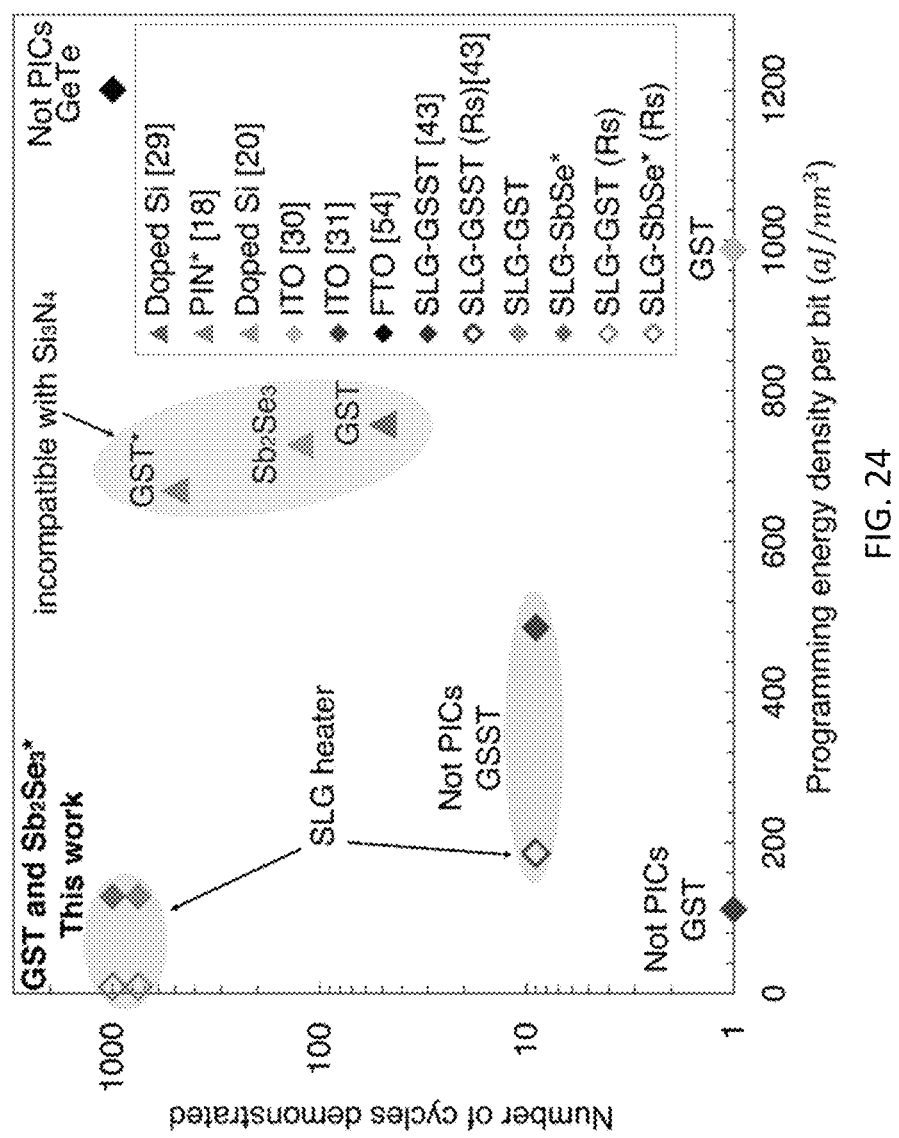

FIG. 24 provides a plot of the number of switching cycles demonstrated against the programming energy density per bit of recent reports regarding electrical tuning of PCMs in photonics devices. The programming energy density is defined as the switching energy per unit volume of PCMs, i.e., $$\frac{E_{swith}}{V_{pcm}}.$$

The normalization with respect to PCM volume will ensure a fair comparison between different heater/switch geometries without considering the device architecture. Specifically, a microring and waveguide-based modulators will have vastly different switching energy due to photon storage in the microring, but similar switching energy density.

In this comparative example, the focus is on low-loss conductors including doped silicon, TCOs, and graphene as they afford low insertion loss for integrated photonic applications. It can be seen that doped silicon and PIN heaters generally have remarkable endurance with the highest demonstrated cyclability of 500 cycles using a PIN heater. However, they exhibit a relatively high programming energy, which lies between 600 and 800 nJ/nm³, indicated in the grey region. The low energy efficiency may be the result of large heating volume due to severe heat dissipation into silicon. For example, in order to change ~10-20 nm thick PCM, a 220 nm thick silicon waveguide has to be heated up to the PCM melting point, leading to significant power waste.

Lastly, such heaters cannot be used with materials that cannot be doped, such as $Si_3N_4$. On the other hand, notwithstanding theoretical predictions, TCO heaters have programming energies that are drastically different than silicon heaters, which may be due to substantial variations in the growth conditions of TCOs whereas the growth and doping conditions for silicon is relatively standardized.

Although high endurance (1,000 cycles) has been shown using a fluorine-doped tin oxide (FTO) heater, the switching has not been demonstrated in integrated photonics and the observed energy efficiency has been very low. Meanwhile, ITO heaters are more widely explored for integrated photonics but suffer from endurance issues.

Moreover, graphene heaters for tuning $Ge_2Sb_2Se_4Te$ (GSST) have been utilized, where the reversible switching has been demonstrated but not in PICs. The endurance of GSST on graphene heaters has yet to reach the same level as previously demonstrated using metal heater.

As discussed above, in various embodiments, the use of a graphene heater for causing a change in the material phase of GST can drastically reduce the total programming energy to an exceedingly low switching energy of 8.7±1.4 nJ/nm³, when the power loss due to the contact resistance was subtracted. The extracted switching energy is very close to the simulated value of 6.6 nJ/nm³ and within one order of magnitude of the 1.2 nJ/nm³ fundamental thermodynamic limit of GST phase change. Such ultra-low programming energy density represents a 20-fold reduction in energy compared to the previous graphene heaters and a 70-fold reduction compared to the most energy-efficient doped silicon heater reported in literature.

Again, without being limited to any particular theory, the high energy efficiency demonstrated for examples of photonic devices according to the present invention may be primarily due to the use of the atomically thin heating volume of graphene, which represents a ~650 times reduction in heating volume compared to the doped silicon for the same heater area. Secondly, the thermal boundary resistance between the graphene/$Al_2O_3$/Si thin film stack considerably limits thermal dissipation into the silicon underneath (see also S2 in S.I. for heat transfer simulations).

Instead of using a large graphene area (~100 µm×10.5 µm), most of which may not contribute to the heating of the PCM, the reduction in the size of the extension regions down to only ~0.3 µm×5.2 µm in the examples discussed above can confine the graphene layer to the vicinity of the waveguide and PCMs (see FIG. 1), thereby drastically minimizing the unnecessary heating and the power loss. In addition to energy efficiency, the above examples also show that graphene is a reliable heater with the highest cyclability of 1,000 cycles that has been demonstrated in electrically tunable phase-change PICs so far.

By way of summary and further illustration, Table 1 below provides an illustrative comparison of performance of some conventional non-volatile electrically reconfigurable photonic platforms relative to the above examples of photonic platforms in accordance with embodiments of the present invention. It should be understood that this data regarding the performance of a photonic platform in accordance with the present invention is provided only for illustration purposes and is not intended to necessarily indicate the optimal results that can be achieved using photonic platforms according to the present invention.

TABLE 1

| Heater | PCM | Amorphization | | | | Crystallization | | | | Cycla-bility | Number of levels | Compatibility with non-Si platforms |
|---|---|---|---|---|---|---|---|---|---|---|---|---|
| | | Voltage (V) | Current (mA) | Power (mW) | Energy density $(aJ/nm^1)$ | Voltage (V) | Current (mA) | Power (mW) | Energy density $(aJ/nm^1)$ | | | |
| Doped Si | GST | 11.2 | 45 | 504 | 755 | 4.75 | 19 | 90.3 | 679 | 50 | 5 | x |
| PIN | GST | 2.5 | 32 | 80 | 667 | 1 | 0.60 | 0.6 | 6500 | 500 | 2 | x |
| Doped Si | Sb2Se3 | 21 | 7.8 | 163.8 | 728 | 3.2 | 3 | 9.6 | 1.07E+05 | 125 | 9 | x |
| ITO | GST | 10 | 20 | 200 | 988 | 6 | 12 | 72 | 3.56E+05 | 1 | 3 | •• |
| ITO | GST | 9 | 22.5 | 202 | 111 | 3 | 0.2 | 22 | 5.67E+07 | 1 | >2 | |
| FTO[14] | GeTe | 4 | 200 | 800 | 1200 | 3 | 150 | 450 | 2267 | 1,000 | 2 | |

While the invention is described through the above-described exemplary embodiments, modifications to, and variations of, the illustrated embodiments may be made without departing from the inventive concepts disclosed herein. For example, although specific parameter values, such as materials and dimensions, may be recited in relation to disclosed embodiments, within the scope of the invention, the values of all parameters may vary over wide ranges to suit different applications. Unless otherwise indicated in context or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, need not be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

A controller that operates the phase shifters, etc., or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc. Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective elements from one another and are not intended to indicate any particular order or total number of such elements in any particular embodiment. Thus, for example, a given embodiment may include only a second element and a third element.

What is claimed is:

1. An integrated photonic device, comprising:

a waveguide having a top surface, a bottom surface and a pair of side surfaces, the waveguide configured to guide radiation having one or more wavelengths within a wavelength band, a heat-actuable phase change material (PCM) optically coupled to the waveguide, and a heater disposed between the waveguide and the PCM, the heater having a two-dimensional material layer at least partially disposed above the top surface of the waveguide and configured for application of a voltage pulse thereto for causing heating thereof, and a first electrically insulating spacer layer separating said two-dimensional material layer from the top surface of the waveguide, wherein said two-dimensional material layer is in thermal communication with the PCM such that heat transfer from the two-dimensional material layer, when heated, to the PCM causes the PCM to undergo a material phase transition between a crystalline state and an amorphous state, thereby causing a change in a refractive index of the PCM and a resultant change in at least one of a phase and transmission of an electromagnetic wave propagating through the waveguide.

2. The integrated photonic device of claim 1, wherein the heater further comprises a pair of electrically conductive contacts electrically coupled to the two-dimensional material layer to allow application of the voltage pulse thereto.

3. The integrated photonic device of claim 1, wherein said two-dimensional material layer comprises any of a semi-metal, and a doped semiconductor.

4. The integrated photonic device of claim 1, further comprising a voltage source for applying said voltage pulse to the two-dimensional material layer.

5. The integrated photonic device of claim 4, further comprising a controller in communication with said voltage source.

6. The integrated photonic device of claim 5, wherein said controller is configured to generate a first voltage pulse for application to said two-dimensional material layer, wherein said first voltage pulse is suitable for causing a material phase transition of the PCM from the crystalline state to the amorphous state.

7. The integrated photonic device of claim 6, wherein said controller is further configured to generate a second voltage pulse for application to said two-dimensional material layer, wherein said second voltage pulse is suitable for causing a material phase transition of the PCM from the amorphous state to the crystalline state.

8. The integrated photonic device of claim 1, wherein said waveguide is positioned between two electrically conductive contacts and the two-dimensional material layer forms a bridge over the top surface of the waveguide between the two electrically conductive contacts.

9. The integrated photonic device of claim 1, wherein said PCM is disposed above said two-dimensional material layer and the top surface of the waveguide.

10. The integrated photonic device of claim 9, further comprising a second electrically insulating spacer layer separating said two-dimensional material layer from said PCM.

11. The integrated photonic device of claim 10, wherein any of said first and said second electrically insulating layer comprises any of:

Al2O3;
SiO2;
silicon nitride;
Hafnia;
ZnS;
ZnS—SiO2;
silicon carbide; or
titanium dioxide.

12. The integrated photonic device of claim 10, wherein any of said first and second electrically insulating spacer layer has a thickness in a range of about 10 nm to about 50 nm.

13. The integrated photonic device of claim 1, further comprising an insulating capping layer.

14. The integrated photonic device of claim 13, wherein said insulating cap layer comprises any of:

Al2O3;
SiO2;
silicon nitride;
Hafnia;
ZnS;
ZnS—SiO2;
silicon carbide; or
titanium dioxide.

15. The integrated photonic device of claim 14, wherein said insulating cap layer has a thickness in a range of about 10 nm to about 50 nm.

16. The integrated photonic device of claim 1, wherein said wavelength band comprises the visible portion of the electromagnetic spectrum.

17. The integrated photonic device of claim 1, wherein said wavelength band comprises the infrared portion of the electromagnetic spectrum.

18. The integrated photonic device of claim 1, wherein said heat-actuable PCM comprises a chalcogenide glass selected from the group consisting of a sulfide, a selenide, a telluride, networked with any of Ge, Sb, As, Si, Sn, in, Ag, and Bi.

19. The integrated photonic device of claim 1, wherein said heat-actuable PCM comprises any of antimony sulfide (SbS) and antimony selenide (SbSe).

20. The integrated photonic device of claim 19, wherein said PCM comprises Sb2Se3.

21. The integrated photonic device of claim 1, wherein the waveguide comprises any of silicon, silicon nitride, diamond, silicon carbide, or titanium dioxide.

22. The integrated photonic device of claim 1, wherein the waveguide comprises a ridge waveguide.

23. The integrated photonic device of claim 1, wherein the integrated photonic device comprises a phase shifter.

24. The integrated photonic device of claim 1, wherein the integrated photonic device comprises a transmission waveguide.

25. The integrated photonic device of claim 1, wherein the first electrically insulating spacer layer separates the two-dimensional material layer from the surface of the waveguide and from the two side surfaces of the waveguide.

26. An integrated photonic device comprising:

a waveguide through which radiation having one or more wavelengths within a wavelength band can propagate;

a heat-actuable phase change material (PCM) optically coupled to the waveguide;

a heater disposed between the waveguide and the PCM, the heater having a two-dimensional material layer at least partially disposed above a top surface of the waveguide and configured for application of a voltage pulse thereto for causing heating thereof and shaped to cover a surface of the PCM and flank sidewalls of the PCM; and wherein said two-dimensional material layer is in thermal communication with the PCM such that heat transfer from the two-dimensional material layer, when heated, to the PCM causes the PCM to undergo a material phase transition between a crystalline state and an amorphous state, thereby causing a change in a refractive index of the PCM and a resultant change in at least one of a phase and transmission of an electromagnetic wave propagating through the waveguide.

27. The integrated photonic device of claim 26, wherein said waveguide is positioned between two electrically conductive contacts and the two-dimensional material layer forms a bridge over the top surface of the waveguide between the two electrically conductive contacts.

28. The integrated photonic device of claim 26, wherein the heater further comprises a pair of electrically conductive contacts electrically coupled to the two-dimensional material layer to allow application of the voltage pulse thereto.

29. The integrated photonic device of claim 26, further comprising a first electrically insulating spacer layer separating said two-dimensional material layer from the top surface of the waveguide.

30. The integrated photonic device of claim 29, further comprising a second electrically insulating spacer layer separating said two-dimensional material layer from said PCM.

31. The integrated photonic device of claim 29, wherein the first electrically insulating spacer layer separates the two-dimensional material layer from the surface of the waveguide and from the two side surfaces of the waveguide.

\*  \*  \*  \*  \*